(12) United States Patent
De Haan et al.

(10) Patent No.: US 10,515,667 B2
(45) Date of Patent: Dec. 24, 2019

(54) HDR METADATA TRANSPORT

(71) Applicant: KONINKLIJKE PHILIPS N.V., Eindhoven (NL)

(72) Inventors: Wiebe De Haan, Eindhoven (NL); Charles Leonardus Cornelius Maria Knibbeler, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 565 days.

(21) Appl. No.: 14/904,959

(22) PCT Filed: Jul. 21, 2014

(86) PCT No.: PCT/EP2014/065579
§ 371 (c)(1),
(2) Date: Jan. 14, 2016

(87) PCT Pub. No.: WO2015/007910
PCT Pub. Date: Jan. 22, 2015

(65) Prior Publication Data
US 2016/0163356 A1    Jun. 9, 2016

(30) Foreign Application Priority Data

Jul. 19, 2013  (EP) .................................. 13177150

(51) Int. Cl.
*G11B 27/10* (2006.01)
*H04N 11/24* (2006.01)
(Continued)

(52) U.S. Cl.
CPC ............ *G11B 27/105* (2013.01); *G11B 20/10* (2013.01); *G11B 27/329* (2013.01); *H04N 9/646* (2013.01);
(Continued)

(58) Field of Classification Search
CPC ... G11B 27/105; G11B 27/201; G11B 27/329; H04N 11/24; H04N 9/646; H04N 9/87;
(Continued)

(56) References Cited

U.S. PATENT DOCUMENTS

2010/0150523 A1* 6/2010 Okubo .................... H04N 5/782
   386/343
2011/0316973 A1* 12/2011 Miller .................... G09G 3/003
   348/43

(Continued)

FOREIGN PATENT DOCUMENTS

EP   1708485 A1   10/2006
WO   2006050305 A1   5/2006

(Continued)

OTHER PUBLICATIONS

"Parameter Values for the HDTV Standards for Production and International Programme Exchange", Rec. ITU-R BT.709-4, 2009, pp. 1-30.

(Continued)

*Primary Examiner* — Mishawn N. Hunter

(57) ABSTRACT

A video distribution system transfers a formatted video signal (20) having elementary streams representing audio-visual content to be rendered in a selected combination and stream information indicative of selectable elementary streams. The formatted video signal represents extended video having an extended range (HDR) of brightness and/or color. A video device (21) processes input video to provide video processing metadata representing a conversion between standard video and the extended video. The formatted video signal comprises a primary video elementary stream representing standard or extended video, a video processing elementary stream not comprising audiovisual content but comprising video processing metadata representing a conversion between standard and extended video or vice versa, and extended stream information comprising an entry indicative of the video processing elementary (Continued)

stream. Advantageously a video player (22), for example a BD player, is enabled to render both extended and standard video based on the extended stream information and the video processing elementary stream.

20 Claims, 12 Drawing Sheets

(51) Int. Cl.

| | |
|---|---|
| *H04N 21/235* | (2011.01) |
| *H04N 21/426* | (2011.01) |
| *H04N 21/2343* | (2011.01) |
| *H04N 21/63* | (2011.01) |
| *G11B 20/10* | (2006.01) |
| *G11B 27/32* | (2006.01) |
| *H04N 21/4402* | (2011.01) |
| *H04N 9/64* | (2006.01) |
| *H04N 9/87* | (2006.01) |

(52) U.S. Cl.
CPC .............. *H04N 9/87* (2013.01); *H04N 11/24* (2019.01); *H04N 21/2358* (2013.01); *H04N 21/234327* (2013.01); *H04N 21/42646* (2013.01); *H04N 21/440227* (2013.01); *H04N 21/631* (2013.01)

(58) Field of Classification Search
CPC ....... H04N 21/234327; H04N 21/2358; H04N 21/42646; H04N 21/440227; H04N 21/631
See application file for complete search history.

(56) References Cited

U.S. PATENT DOCUMENTS

| | | | |
|---|---|---|---|
| 2012/0183229 A1* | 7/2012 | McDevitt | H04N 21/47815 382/218 |
| 2012/0314773 A1 | 12/2012 | Gish et al. | |
| 2013/0148907 A1* | 6/2013 | Su | G06T 9/004 382/238 |
| 2014/0125696 A1 | 5/2014 | Newton et al. | |

FOREIGN PATENT DOCUMENTS

| | | |
|---|---|---|
| WO | 2010021705 A1 | 2/2010 |
| WO | 2012021705 | 2/2012 |
| WO | 2012147022 | 11/2012 |
| WO | 2012172460 A1 | 12/2012 |
| WO | 2013046095 A1 | 4/2013 |

OTHER PUBLICATIONS

"Parameter Values for Ultra-High Definition Television Systems for Production and International Programme Exchange", Rec. ITU-R BT.2020, 2012, pp. 1-7.

Blu-Ray Disc, White Paper, 2.B "Audio Visual Application Format Specifications for BD-ROM Version 2.5", Jul. 2011, pp. 1-56.

Information Technology—Generic Coding of Moving Pictures and Associated Audio Information: Systems, International Standard, ISOO/IEC 13818-1, 2000, pp. 10173.

* cited by examiner

| Syntax | No. of bits | Mnemonics |
|---|---|---|
| HDR elementary stream () { | | |
|   number_of_ HDR Segments | 16 | uimsbf |
|   for (i=0; i< number_of_ HDR Segments; i++) { | | |
|     HDR Segment() | | |
|   } | | |
| } | | |

FIG. 5a

| Syntax | No. of bits | Mnemonics |
|---|---|---|
| HDR Segment() { | | |
|   segment_descriptor() | | |
|   reserved | 7 | bslbf |
|   HDR_start_PTS | 33 | uimsbf |
|   reserved | 7 | bslbf |
|   HDR_end_PTS | 33 | uimsbf |
|   HDR_info() | | |
| } | | |

FIG. 5b

| Syntax | No. of bits | Mnemonics |
|---|---|---|
| segment_descriptor() { | | |
|   segment_type | 8 | bslbf |
|   segment_length | 16 | uimsbf |
| } | | |

FIG. 5c

| Syntax | No. of bits | Mnemonics |
|---|---|---|
| HDR_info() { | | |
|   Video_process_descriptor | | |
|   Menu_process_descriptor | | |
|   Subtitle_process_descriptor | | |
| } | | |

FIG. 5d

| Syntax | No. of bits | Mnemonics |
|---|---|---|
| Video_process_descriptor () { | | |
|     for (i=0; i< 256; i++) { | | |
|         Corr(i) | 8 | uimsbf |
| } | | |

| Syntax | No. of bits | Mnemonics |
|---|---|---|
| Menu_process_descriptor () { | | |
|     Min_transparency_level | 8 | uimsbf |
| } | | |

| Syntax | No. of bits | Mnemonics |
|---|---|---|
| Subtitle_process_descriptor () { | | |
|     Subtitle_Luma_factor | 8 | uimsbf |
| } | | |

| Syntax | No. of bits | Mnemonic |
|---|---|---|
| Playlist() { | | |
|    length | 32 | uimsbf |
|    reserved_for_future_use | 16 | bslbf |
|    number_of_Playitems | 16 | uimsbf |
|    number_of_SubPaths | 16 | uimsbf |
|    for (Playitem_id=0;<br>      Playitem_id<number_of_Playitems;<br>      Playitem_id++) { | | |
|       Playitem() | | |
|    } | | |
|    for (SubPath_id=0;<br>      SubPath_id<nember_of_SubPaths;<br>      SubPath_id++) { | | |
|       SubPath() | | |
|    } | | |
| } | | |

| Syntax | No. of bits | Mnemonic |
|---|---|---|
| Playitem() { | | |
| length | 16 | uimsbf |
| Clip_information_file_name[0]   //angle_id=0 | 8*5 | bslbf |
| • • • | 8*4 | bslbf |
| | 11 | bslbf |
| | 1 | bslbf |
| | 8 | uimsbf |
| } | | |
| } | | |
| } | | |
| STN_table() | | |
| } | | |

FIG. 8c

| Syntax | No. of bits | Mnemonic |
|---|---|---|
| STN table() { | | |
|    length | 16 | uimsbf |
|    reserved for future use | 16 | uimsbf |
|    number_of_primary_video_stream_entries | 8 | uimsbf |
|    number_of_primary_audio_stream_entries | 8 | uimsbf |
|    number_of_PG_textST_stream_entries | 8 | uimsbf |
|    number_of_IG_stream_entries | 8 | uimsbf |
|    number_of_secondary_audio_stream_entries | 8 | uimsbf |
|    number_of_secondary_video_stream_entries | 8 | uimsbf |
|    number_of_PiP_PG_textST_ stream_entries_plus | 8 | uimsbf |
|    reserved for future use | 40 | bslbf |
|    for (primary_video_stream_id=0; | | |
|       primary_video_stream_id< | | |
|          number_of_primary_video_stream_entries; | | |
|       primary_video_stream_id++) { | | |
|          stream_entry() | | |
|          stream_attributes() | | |
|    } | | |
|    for (primary_audio_stream_id=0; | | |
|       primary_audio_stream_id< | | |
|          number_of_primary_audio_stream_entries; | | |
|       primary_audio_stream_id++) { | | |
|          stream_entry() | | |
|          stream_attributes() | | |
|    } | | |
|    for (PG_textST_stream_id=0; | | |
|       PG_textST_stream_id<number_of_PG_textST_stream_entries; | | |
|       +number_of_PiP_PG_textST_stream_entries_plus; | | |
|       PG_textST_stream_id++) { | | |
|          stream_entry() | | |
|          stream_attributes() | | |

| Syntax | No. of bits | Mnemonic |
|---|---|---|
| STN_Table() { | | |
| .    91 | | |
| . | | |
| . | | |
| Number_of_HDR_Stream_entries | 8 | uimsbf |
| . | | |
| . | | |
| For HDR_Stream_ID=0; | | |
| HDR_Stream_ID< Number_of_HDR_Stream_entries   92 | | 93 |
| HDR_StreamID++ { | | |
|    Stream_Entry() | | |
|    Stream_Attributes() | | |
| } | | |
| } | | |

FIG. 9

| Syntax | No. of bits | Mnemonic |
|---|---|---|
| stream entry() { | | |
|   length   94 | 8 | uimsbf |
|   type | 8 | bslbf |
|   if(type==1) { | | |
|     ref_to_stream_PID_of_mainClip | 16 | uimsbf |
|     reserved_for_future_use | 48 | bslbf |
|   } else if(type==2) { | | |
|     ref_to_SubPath_id   95 | 8 | uimsbf |
|     ref_to_subClip_entry_id | 8 | uimsbf |
|     ref_to_stream_PID_of_subClip | 16 | uimsbf |
|     reserved_for_future_use   96 | 32 | bslbf |
|   } else if(type==3) { | | |
|     ref_to_SubPath_id | 8 | uimsbf |
|     ref_to_stream_PID_of_mainClip | 16 | uimsbf |
|     reserved_for_future_use | 40 | bslbf |
|   } | | |
| } | | |

FIG. 10a

| Syntax | No. of bits | Mnemonic |
|---|---|---|
| stream_attributes() { | | |
|     length | 8 | uimsbf |
|     stream_coding_type | 8 | bslbf |
|     if (*stream_coding_type*==0x02 \|\| | | |
|         *stream_coding_type*==0x1B \|\| | | |
|         *stream_coding_type*==0xEA) { | | |
|         video_format | 4 | bslbf |
|         frame rate | 4 | bslbf |
|         reserved_for_future_use | 24 | bslbf |
|     } else if (*stream_coding_type*==0x80 \|\| | | |
|         *stream_coding_type*==0x81 \|\| | | |
|         *stream_coding_type*==0x82 \|\| | | |
|         *stream_coding_type*==0x83 \|\| | | |
|         *stream_coding_type*==0x84 \|\| | | |
|         *stream_coding_type*==0x85 \|\| | | |
|         *stream_coding_type*==0x86 \|\| | | |
|         *stream_coding_type*==0xA1 \|\| | | |
|         *stream_coding_type*==0xA2) { | | |
|         audio_presentation_type | 4 | bslbf |
|         sampling_frequency | 4 | bslbf |
|         audio_language_code | 8*3 | bslbf |
|     } else if (*stream_coding_type*==0x90) { | | |
|         // Presentation Graphics stream | | |
|         PG_language_code | 8*3 | bslbf |
|         reserved_for_future_use | 8 | bslbf |

| Syntax | No. of bits | Mnemonics |
|---|---|---|
| Stream_attributes() { | | |
| . | | |
| . | | |
| . | | |
| . | | |
| Else if (Stream)coding_type== 0xTBD) {<br>// HDR_stream | | ⎱ 98 |
| Optimum_Display_type | 8 | ⎰ uimsbf |
| } | | |
| } | | |

| Optimum_Display_type | Maximum Brightness | Color Gamut |
|---|---|---|
| 1 | 500 $cd/m^2$ | ITU-R recommendation BT.709 |
| 2 | 1000 $cd/m^2$ | ITU-R recommendation BT.709 |
| 3 | 2000 $cd/m^2$ | ITU-R recommendation BT.709 |
| 4 | 500 $cd/m^2$ | ITU-R recommendation BT.601 |
| 5 | 1000 $cd/m^2$ | ITU-R recommendation BT.601 |
| 6 | 2000 $cd/m^2$ | ITU-R recommendation BT.601 |
| . | | |
| . | | |

FIG. 12

HDR METADATA TRANSPORT

CROSS-REFERENCE TO PRIOR APPLICATIONS

This application is the U.S. National Phase application under 35 U.S.C. § 371 of International Application No. PCT/EP2014/065579, filed on Jul. 21, 2014, which claims the benefit of European Patent Application No. 13177150.3, filed on Jul. 19, 2013. These applications are hereby incorporated by reference herein.

FIELD OF THE INVENTION

The invention relates to apparatuses and methods and resulting products like data storage or transmission products or formatted, encoded signals, for allowing delivery of high dynamic range images or video. Apparatuses include video processing devices that initially provide the formatted signal, and video players that receive the formatted video signal. The formatted signal may be broadcast, transferred via a network or storage medium, such as an optical disc or memory stick. Video players include, for example, Blu-ray optical disc players, TV devices or set-top boxes receiving a broadcast signal, computers or portable devices receiving data from server via a network.

BACKGROUND OF THE INVENTION

Recently image capturing, displaying and in particular encoding has improved from so-called low dynamic range (LDR) imaging (such as used for well known classical, standardized systems like PAL or MPEG2) to so-called high dynamic range imaging (HDR). Illuminances in nature can range from 100,000 lux in sunlight, over typical office or room illuminations of around 500 lux, to e.g. 0.05 lux under quarter moonlight. Luminances (L) in the world range from 1 billion nit of the sun disk, to 10,000s of nits for lamps, to a couple of (ten) thousands of nit for objects in sunlight (like a building, cloud rims, or a white paper), to hundredths or 10s of nits for objects under (heavily) overcast sky or indoors, to 0.1 nit for a white paper under moonlight, etc. This doesn't necessarily mean one should render these luminances on a display in exactly the same way, rather, the picture should look artistically good, meaning at least that there should be approximately similar appearance differences for the regional luminances of objects when rendered on the display screen.

A further extension of image quality may be achieved by extending the color space compared to the classical standardized video, usually called LDR systems. The extended range video as discussed in this document has an extended brightness range, an extended color space, or a combination of an extended brightness range and extended color space, and may be called HDR video.

One should understand that tone mapping for rendering on a particular display is with the many displays existing nowadays decoupled from capturing or coding, leading to three linked representations. In general, a requirement of HDR imaging to be able to render e.g. a bright white wall differently from an adjacent bright lamp on a display, is that their respective pixels are also encoded with different luma (Y) values. Sensors or cameras are becoming more powerful in that indeed they can capture most of those many different luminances and/or colors in the world faithfully (whether with larger well-depths, differently exposed pictures, etc.), and for simplicity we shall consider their native color representation to be a linear luminance encoding within [Lmin, Lmax]+chromatic information. We may then use an entirely arbitrarily specified definition (according to desired requirements of course, such as e.g. later processability of the encoded information like local brightening, or data compression concerns, etc.) for our transmission codec. Lastly this encoded data (Y_C1C2, or similar) can then again be converted in many ways to a rendering-side representation, which we can for simplicity equate with driving values for e.g. the LCD pixel colors. New displays may have more renderable dynamic range, so that they can firstly render more bright regions, and secondly simultaneously or successively more dark regions. Such extended range allows placing all these various luminance objects along the renderable gamut with optimal rendered output colors. Also the available color space may be extended.

Blu-ray discs and players were introduced in the market in 2006 and since then millions of players, including PlayStation 3 game consoles, have been sold. The Blu-ray discs (BD) mostly contain a 2D or 3D feature movie with a playing time of around 2 hours and additional content (bonus material). The video content on these discs has been color graded for relatively low brightness levels and a color matrix defined in ITU-R recommendation BT.709 "Parameter values for the HDTV standards for production and international programme exchange", available from: http://www.itu.int/dms_pubrec/itu-r/rec/bt/R-REC-BT.709-5-200204-I!!PDF-E.pdf.

Recently, the broadcast and content industry is showing a lot of interest to move from Full HD resolution to double horizontal and vertical resolution (3840×2160). This quad Full HD (QFHD) resolution is sometimes referred to as 4K. In addition to increasing the resolution, there is also a wish to move to higher frame rates (48 Hz, 60 Hz), higher bit depth for coding the color components, higher dynamic range and wider color gamut. Together the higher quality video specifications are often referred to as Ultra HD. See Rec ITU-R recommendation BT.2020, available from: http://www.itu.int/dms_pubrec/itu-r/rec/bt/R-REC-BT.2020-0-201208-I!!PDF-E.pdf. Meanwhile a new codec was developed in a joint effort by ITU-T and MPEG, dubbed HEVC (a.k.a. ITU-T H.265 or MPEG-H Part 2), which is generally considered to be about twice as efficient as AVC.

Display devices with higher brightness levels and/or wider color gamut as discussed above are appearing in the market. The non-standardized brightness levels can be anything from (say) 200 nits to 1000 nits or higher. Existing Blu-ray content is graded for lower brightness and to utilize the higher brightness the HDR displays may apply some algorithm to stretch the brightness of the content. The result may not be ideal from a creative point of view. One way to take into account the creative intent when stretching to higher brightness is to include information with the content to tell the player (or the display) how to do the stretching. This stretching may vary during playback (e.g. change per scene), or may even be spatially adapted. Also, the stretching may be different for the video and the overlaying graphics (e.g. subtitles and menus). Examples of how this information may look like are described in patent application WO2013/046095, which describes a system for dynamic range transformation of images. A dynamic range transform, i.e. a conversion processing schedule, is discussed for converting encoded video between LDR video and HDR video for a target HDR display. A target display reference may be included in the output image signal. Also a further document WO2012/147022 describes mapping between HDR and LDR video, which mapping may be defined by predefined mapping algorithm data. Further examples are provided on how to use this information to optimize the processing of the video or the graphics or both.

From the above it follows that generating HDR video and converting between HDR and LDR video according to video processing metadata representing a conversion between the HDR video and the LDR video, are known as such. However, a considerable problem for content creators is that many users still have legacy equipment that cannot handle the extended luminance and/or color range provided by the HDR material.

WO2012/021705 discloses systems and methods for content delivery of at least two versions. The transfer signal has a first version of the content, a difference data representing a difference between the first version and second version of content, and metadata derived from transformation functions that relate the first and second version to a master version.

EP 1708485 discloses a transfer format for video data between a display device (TV receiver) and a processing device (optical disc player). The display device provides a reception specification (EDID signal) that defines the signals that can be displayed. The processing device generates the corresponding version (SD or HD) of the content.

SUMMARY OF THE INVENTION

It is an object of the invention to provide a video distribution system for transferring video to devices enabled for extended range video and standard video devices.

For this purpose, according to a first aspect of the invention, a method is provided for providing a formatted video signal for transfer according to a standardized transfer format, the standardized transfer format defining stream information having entries indicative of selectable elementary streams and elementary streams having a common structure according to the standardized transfer format and representing audiovisual content to be rendered in a selected combination of the elementary streams, a respective elementary stream representing one of video content, audio content, graphics content;
the formatted video signal representing extended video having an extended range of brightness and/or color with respect to standard video having a standard range of brightness and/or color, the standard range being as defined in the standardized transfer format; the method comprising
 processing input video to provide video processing metadata representing a conversion between the standard video and the extended video and generating a primary video elementary stream representing the standard video, or
 processing input video to provide video processing metadata representing a conversion between the extended video and the standard video and generating a primary video elementary stream representing the extended video;
 generating a video processing elementary stream having the common structure but not comprising audiovisual content, the video processing elementary stream comprising the video processing metadata for converting in rendering the selected combination,
 generating extended stream information comprising at least an entry indicative of the primary video elementary stream and an entry indicative of the video processing elementary stream, and
 generating the formatted video signal comprising the primary video elementary stream, the video processing elementary stream and the extended stream information.

According to a further aspect of the invention, a video processing device is provided for providing a formatted video signal for transfer according to a standardized transfer format, the standardized transfer format defining stream information having entries indicative of selectable elementary streams and elementary streams having a common structure according to the standardized transfer format and representing audiovisual content to be rendered by a selected combination of the elementary streams, a respective elementary stream representing one of video content, audio content, graphics content;
the formatted video signal representing extended video having an extended range for brightness and/or color with respect to standard video content having a standard range, the standard range being as defined in the standardized transfer format;
the processing device comprising
 a video processing unit for processing input video, and
 a formatting unit for generating the formatted video signal;
the video processing unit and the formatting unit being arranged for
 processing input video to provide video processing metadata representing a conversion between the standard video and the extended video and generating a primary video elementary stream representing the standard video, or
 processing input video to provide video processing metadata representing a conversion between the extended video and the standard video and generating a primary video elementary stream representing the extended video;
and the formatting unit being further arranged for
 generating a video processing elementary stream having the common structure but not comprising audiovisual content, the video processing elementary stream comprising the video processing metadata for converting in rendering the selected combination,
 generating extended stream information comprising at least an entry indicative of the primary video elementary stream and an entry indicative of the video processing elementary stream, and
 generating the formatted video signal comprising the primary video elementary stream, the video processing elementary stream and the extended stream information.

According to a further aspect of the invention, a video player is provided for processing a formatted video signal according to a standardized transfer format, the standardized transfer format defining stream information having entries indicative of selectable elementary streams and elementary streams having a common structure according to the standardized transfer format and representing audiovisual content to be rendered in a selected combination of the elementary streams, a respective elementary stream representing one of video content, audio content, graphics content;
the formatted video signal representing extended video having an extended range for brightness and/or color with respect to standard video content having a standard range, the standard range being as defined in the standardized transfer format;
the formatted video signal comprising
 a video processing elementary stream having the common structure but not comprising audiovisual content, the video processing elementary stream comprising video processing metadata for converting in rendering the selected combination,
 a primary video elementary stream representing the standard video and the video processing metadata representing a conversion between the standard video and the extended video, or a primary video elementary stream representing the extended video and the video processing metadata representing a conversion between the extended video and the standard video;

and the formatted video signal further comprising extended stream information comprising at least an entry indicative of the primary video elementary stream and an entry indicative of the video processing elementary stream;

the player comprising an input unit for receiving the formatted video signal and extracting the extended stream information and the video processing metadata, a processing unit for processing the extended stream information, and, in dependence on the extended stream information entry indicating a video processing elementary stream, converting primary video from the primary video elementary stream into target video adapted to brightness and/or color rendering capabilities of a target display device by processing the primary video according to the video processing metadata.

According to a further aspect of the invention, a formatted video signal is provided for transfer according to a standardized transfer format, the standardized transfer format defining stream information having entries indicative of selectable elementary streams and elementary streams having a common structure according to the standardized transfer format and representing audiovisual content to be rendered in a selected combination of the elementary streams, a respective elementary stream representing one of video content, audio content, graphics content;

the formatted video signal representing extended video having an extended range for brightness and/or color with respect to standard video content having a standard range, the standard range being as defined in the standardized transfer format;

the formatted video signal comprising a video processing elementary stream having the common structure but not comprising audiovisual content, the video processing elementary stream comprising video processing metadata for converting in rendering the selected combination, a primary video elementary stream representing the standard video and the video processing metadata representing a conversion between the standard video and the extended video, or a primary video elementary stream representing the extended video and the video processing metadata representing a conversion between the extended video and the standard video;

and the formatted video signal further comprising extended stream information comprising at least an entry indicative of the primary video elementary stream and an entry indicative of the video processing elementary stream.

The measures have the effect that the formatted video signal is according to a standardized transfer format such as MPEG video, and is transferrable via the existing distribution channels such as optical discs, broadcasting and/or internet.

The standardized transfer format defines stream information that is indicative of the contents of the formatted video signal. The stream information has entries indicative of selectable elementary streams, for example playlist information on a Blu-ray Disc, or a separate file for a download, or program information included in a multiplexed stream for broadcasting.

The standardized format further defines the elementary streams representing audiovisual content to be rendered by a selected combination of the elementary streams. As such, elementary streams are known from, e.g., MPEG and Blu-ray Disc. An elementary stream contains only one kind of data, e.g. audio, video or graphics, while each elementary stream has a common structure according to the standardized transfer format, for example the structure defining a data packet and a header having standardized contents. The data in the elementary stream depends upon the codec and type of data carried in the stream. Elementary streams may be packetized and may include or have associated with them time information to enable mutual synchronization of multiple elementary streams, e.g. data is packetized and the packet headers contain time stamps linked to frame start codes in the packet payload. The video processing elementary stream also has said common structure and is for converting in rendering the selected combination, i.e. used for determining the conversion processing during rendering with the other elementary streams.

The method or video processing device providing the formatted signal, the formatted signal as transferred and the video player processing the formatted signal to provide the target video together constitute the video distribution system for transferring standard range and extended range video. The extended stream information informs, via said entry, the receiving side whether the video processing elementary stream is present. For example, the entry may be a bit flag indicating said presence, a list of streams containing a stream identifier that indicates the video processing elementary stream, a formatted field containing the number of available video processing elementary streams, etc. By providing, in the formatted signal, the video processing elementary stream and the extended stream information, the video player is enabled to selectively render a standard version, e.g. LDR, or an extended version, e.g. HDR, of the primary video in the primary video elementary stream by either directly using the primary video or converting said primary video using the video processing metadata. At the rendering side, the primary video from the primary video elementary stream is converted by applying the video processing metadata into target video adapted to brightness and/or color rendering capabilities of a target display device, which may be known, preset or determined by communicating to the display. The user may be enabled to set or select a required level of conversion.

The formatted video signal representing the extended video may, for example, be transferred via a medium like an optical disc, a broadcast signal or internet to a video player like an optical disc player or a TV set or set top box. The extended formatted signal may be structured according to the respective known transfer format, so as to be downward compatible. Thereto the extended formatted signal may comprise components similar to known signal components. For example on the Blu-ray optical disc a traditional playlist is provided in a file on the disc, and the extended stream information may be similarly provided. So in that case the extended stream information is in a file separate from the transport stream(s) containing the elementary streams. However, for broadcasting there is a different type of stream information to indicate which elementary stream contains which information. The stream information for broadcasting formats is usually called program specific information (PSI), as further elucidated on http://en.wikipedia.org/wiki/Program-specific_information. In the current document the extended stream information is formatted according to the requirements of the used transfer format, such as the extended optical disc type playlist and the extended broadcast program specific information. In practice, the extended PSI is included in the transport stream, while the BD extended playlist is a separate file.

It is to be noted that any conversion between a first range of brightness or color as present in the primary video to any second range of brightness or color as required for displaying may be performed based on respective video processing metadata. The video processing metadata may comprise an indicator for indicating the type of conversion. For example, the video processing metadata may be for converting primary LDR video to HDR video when the primary stream contains LDR video, or for converting primary HDR video to LDR video when the primary stream contains HDR video. Also, different levels of conversion may be embedded in the video processing metadata, e.g. for displays having medium, high or very high brightness levels, or for different color gamuts. Hence, the primary video may be either LDR video to be up-converted, or some type of HDR video that may be converted down to LDR video based on the video processing metadata comprising a respective correction scheme of adapting the brightness range. The primary video may even contain extended video arranged for a medium level HDR display, whereas the video processing metadata provides instruction for both down-converting to LDR video and, alternatively, further up-converting to a higher level HDR display. Finally it is noted that multiple video processing elementary streams may be included in the formatted signal to enable the rendering side to select the appropriate conversion of the primary video.

The invention is also based on the following recognition. The video processing metadata to be transferred represents a conversion scheme between extended video and standard video or vice versa, so it is not audiovisual data that may be reproduced as such. On the contrary, the video processing metadata involves a processing schedule to be applied to video content data provided in a different elementary stream. It is to be noted that, according to the standardized transfer format, any elementary stream is traditionally carrying visual, audio or graphical content, which content may be rendered in a selected combination based on the stream information (e.g. a primary video combined with an audio track in a different language, or a selected graphical menu overlay based on a BD playlist). The inventors have seen that a new type of elementary stream may be alternatively used for carrying the video processing metadata, so the video processing elementary stream does not comprise audiovisual content as traditionally defined in the standardized transfer format but processing instructions instead.

The video processing elementary stream may be multiplexed with further elementary streams to constitute a single versatile signal to be transferred via a single medium. Due to the signal using a further elementary stream for transferring the processing metadata, the signal still complies with the transmission requirements defined for the standardized transfer format, although a new type of elementary stream has been added. Due to the extended stream information, e.g. the extended program-specific information (PSI), the new video player can select the video processing elementary stream to obtain the video processing metadata, while a classical, legacy player may see a further elementary stream but will not enable selection or rendering of that stream, and so will play only the primary video as it is provided. Note that, in cases discussed in this text, only extended and/or standard video elementary streams may be mentioned, but always other elementary streams may also be included in the formatted signal with the video processing stream, e.g. an audio elementary stream, and/or a text based or bitmap graphics stream.

Advantageously the video processing elementary stream may also be distributed separately, e.g. via a different channel, while also using the standardized transfer format on that channel. This is due to such format basically defining an autonomous audiovisual formatted signal based on at least one elementary stream.

Furthermore it is to be noted that the extended stream information has an entry indicative of the video processing elementary stream. The entry enables indicating the availability of the video processing elementary stream, i.e. an elementary stream being present in the formatted signal. For example, an optical disc may be provided with the primary video elementary stream, a playlist containing the extended stream information and the video processing elementary stream. The entry now indicates one available video processing elementary stream. Alternatively, the optical disc may have the primary video elementary stream, the extended stream information but no video processing elementary stream, the entry in the extended stream information now indicating that zero video processing elementary streams are present. Subsequently, a part of the formatted signal may be transferred separately, e.g. via a download from a server, the part containing both an updated extended stream information and at least one video processing elementary stream. In the updated extended stream information the presence of the video processing elementary stream is indicated. Advantageously, a flexible distribution system is provided.

Optionally, the video processing metadata in the video processing elementary stream comprises a field indicating a number of video processing segments in the video processing elementary stream. Advantageously, the number further defines the structure of the video processing metadata. The video processing metadata in the video processing elementary stream may comprise a video processing segment comprising at least one presentation time stamp and a segment descriptor. Advantageously, the presentation time stamp enables synchronizing the video processing metatdata, which is further defined in the segment descriptor. The video processing metadata in the video processing elementary stream may comprise an extended range info field comprising multiple different process descriptors, a respective process descriptor defining the conversion for a respective data type, the data types comprising video and at least one of graphics and subtitles. Advantageously, separate process descriptors are provided to define the processing for respective data types.

Optionally, the formatted video signal comprises a transport stream including the primary video elementary stream and the video processing elementary stream. On a record carrier comprising a track of optical readable marks, the marks may represent the extended stream information and the transport stream including the video processing elementary stream. In the video player, the input unit may be arranged for receiving the transport stream and retrieving, from the transport stream, the primary video elementary stream and the video processing elementary stream. This has the effect that the video processing elementary stream is multiplexed in the same transport stream as the primary video elementary stream. Furthermore, in the video player, the input unit may comprise an optical disc unit for reading an optical record carrier and retrieving the transport stream. The video player is now enabled to render, based on the elementary stream data retrieved from the single multiplexed transport stream, both standard and extended video, as respectively required for a connected display.

Optionally, the formatted video signal is a broadcast signal, and the transport stream comprises the extended stream information in the form of program specific information. Advantageously, all extended range information is comprised in the transport stream, so as to enable a video player, e.g. in the form of a set top box or TV set, to retrieve both the PSI and the video processing elementary stream from the single transport stream.

Optionally, the formatted video signal comprises a first transport stream including the primary video elementary stream, and a second transport stream including the video processing elementary stream. On a record carrier comprising a track of optical readable marks, the marks may represent the extended stream information and the first transport stream including the primary video elementary stream and the second transport stream including the video processing elementary stream. In the video player, the input unit may be arranged for receiving the first and second transport stream and retrieving, from the first transport stream, the primary video elementary stream, and, from the second transport stream, the video processing elementary stream. This has the effect that the video processing elementary stream is multiplexed in a different transport stream as the primary video elementary stream. Both transport streams may be embedded on a single storage medium, such as a BD, in combination with the extended stream information. Furthermore, in the video player, the input unit may comprise an optical disc unit for reading an optical record carrier and retrieving the first and second transport stream. The video player is now enabled to render, based on the elementary stream data retrieved from both the first and the second transport stream, either HDR or LDR video, as required for a connected display.

Optionally, a first part of the formatted signal may be transferred via a medium, e.g. a broadcast system or storage medium, and a second part may be transferred via a network. The first part comprises, in a first transport stream, the primary video elementary stream, and the second part comprises the extended stream information and, in a second transport stream, the video processing elementary stream.

Optionally, a record carrier is provided comprising a track of optical readable marks, wherein the marks represent the extended stream information and the transport stream including the primary video elementary stream and the video processing elementary stream as described above; or the extended stream information and the first transport stream including the primary video elementary stream and the second transport stream including the video processing elementary stream as described above; or the extended stream information and the first transport stream but not the second transport stream as described above.

Optionally, the entry in the extended stream information may indicate the number of video processing elementary streams, the number being an integer larger than or equal to zero. Advantageously, the extended stream information now is enabled for use in a formatted signal comprising just a primary video elementary stream and no video processing elementary streams, when said number is zero. Also, multiple video processing elementary streams may be included in the formatted signal while said number indicates said multiple. Advantageously a versatile extension to the standardized formatted signal is provided by such entry.

Optionally, in the video player, the input unit may comprise an optical disc unit for reading an optical record carrier and retrieving extended stream information and a transport stream comprising the primary video elementary stream. The record carrier may comprise the extended stream information and the first transport stream but not the second transport stream.

Optionally, in the video player, the input unit may comprise a network interface for downloading the video processing elementary stream and the extended stream information from a server to local storage. Furthermore, the processing unit may be arranged for replacing stream information received earlier by the extended stream information. Advantageously, an earlier version of the stream information, e.g. a playlist available from a data carrier also providing a primary video elementary stream having a fixed grading for LDR, may be replaced by the extended stream information as downloaded and available from local storage. The data carrier may, for example, be a BD optical disc containing an LDR version of the video. The video processing elementary stream as downloaded may be locally stored in the video player, and be rendered in a selected combination with other elementary streams retrieved from the data carrier to obtain an HDR version of the video.

Optionally, the video processing elementary stream comprises a sequence of video processing segments, a respective segment being associated with a corresponding sequence of one or more video frames. The association may, for example, be based on corresponding time stamps of the video processing segment and the video frames in the primary video. In this embodiment the video processing segment is a basic data element of a video processing elementary stream. It contains video processing metadata, such as instructions from the content author or creator on how to process video and/or graphics. In the video player, the processing unit may be further arranged for converting sequences of video frames of the primary video into target video by processing the primary video according to the sequence of segments. The video processing segments correspond to a time period of the video, i.e. said sequence of video frames, allowing for frame accurate processing according to the instructions included in the respective video processing segment. The segments allow for independent adaptation of each scene of a movie, e.g. to emphasize the creative intent, to better support the storyline for HDR displays or for optimized color gradings. Further examples of algorithms, correction schedules, color adaptations, etc, are provided later.

Optionally, the video processing elementary stream comprises instructions to adapt brightness level and/or color space of the video in dependence of brightness or color reproduction capabilities of a display device. In the video player, the processing unit may be further arranged for converting the primary video into target video by processing the primary video according to said instructions. Furthermore, the processing unit may be arranged to determine the brightness or color reproduction capabilities of a display device. The instructions may, for example, provide a brightness correction scheme or gamma curve, or a color gamut correction formula. Advantageously, the video may be adapted for a connected display having known reproduction capabilities. The display may also communicate its brightness or color reproduction capabilities to the video player. Also, the display and the processing unit may be integrated in a single device, so that the brightness or color reproduction capabilities are predetermined and known to the processing unit.

Optionally, the video processing elementary stream comprises instructions to adapt brightness level and/or color space of graphics in dependence of brightness or color reproduction capabilities of a display device. In the video player, the processing unit may be further arranged for converting graphics from a graphics elementary stream, or other graphics such as menu overlays generated locally in the video player, by adapting the graphics according to said instructions. The instructions may, for example, provide a brightness correction scheme or gamma curve, or a color gamut correction formula. Also, the instructions may apply to a segment of the primary video, and may change for a subsequent segment. Advantageously, the graphics may be adapted for a connected display having known rendering capabilities. For example, a specific graphics correction instruction may correct the brightness of subtitles when an LDR video program is converted to HDR. The correction avoids the subtitles to be overly bright and dominate the video.

Optionally the video processing metadata embedded in the video processing elementary stream, may be delivered (and where applicable sold) using various channels, signals or encodings, stored on various physical media, etc.

Further preferred embodiments of the devices and methods according to the invention are given in the appended claims, disclosure of which is incorporated herein by reference.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, in which FIG. 1 schematically illustrates how to encode an HDR image as actually an LDR image, which is usable on an LDR, but not with sufficient visual quality on an HDR display, unless one obtains a mapping algorithm data of the encoding method; FIG. 5a-d show an example of a video processing elementary stream, in which FIG. 5a shows a video processing elementary stream having a field indicating a number of video processing segments, FIG. 5b shows an example of the syntax of the video processing segment, FIG. 5c shows an example of the syntax of the Segment Descriptor, FIG. 5d shows an example of the syntax of the HDR info;

FIG. 6 shows an example of a brightness correction function,

FIG. 7a-c show video processing metadata, in which

FIG. 7a shows a Video_process_descriptor for a brightness correction,

FIG. 7b shows a Menu_process_descriptor for a correction of graphics,

FIG. 7c shows a Subtitle_process_descriptor for a correction of subtitles;

FIG. 8a-d show a playlist, in which

FIG. 8a shows the general structure of a playlist according to a standardized format, FIG. 8b shows an example of the syntax of a playlist, FIG. 8c shows an example of the syntax of a playitem in the playlist, FIG. 8d shows a first part of a data structure of an elementary stream table;

FIG. 9 shows an example of the syntax of a extended stream information as an extension of an elementary stream table, FIG. 10a shows a Stream_entry for an elementary stream table, FIG. 10b shows Stream_Attributes for an elementary stream table, FIG. 11 shows an example of an element of the syntax of a extended stream information, and FIG. 12 shows a definition of HDR display types.

Figure 1:
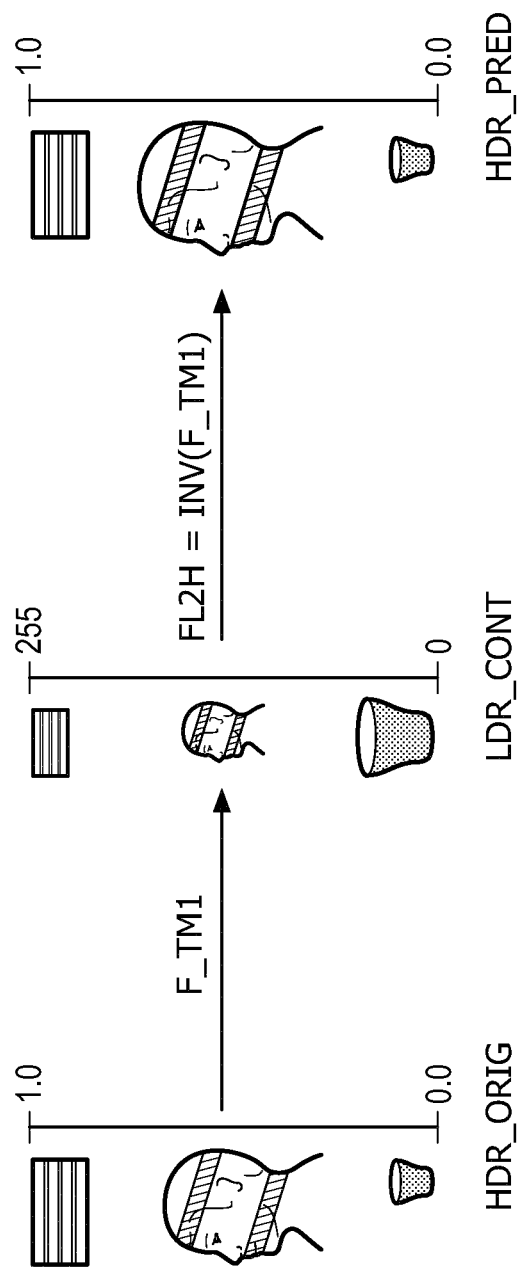

The figures are purely diagrammatic and not drawn to scale. In the Figures, elements which correspond to elements already described may have the same reference numerals. The figures serve merely as non-limiting illustrations exemplifying the more general concept, while dashes may be used to indicate that a component is optional, for indicating that elements are hidden in the interior of an object, or for intangible things such as e.g. selections of objects/regions (e.g. how they may be shown on a display).

DETAILED DESCRIPTION OF THE DRAWINGS

FIG. 1 schematically illustrates how to encode an HDR image graded as an LDR image, which is usable on an LDR, but not with sufficient visual quality on an HDR display, unless one obtains mapping algorithm data of the encoding method. With FIG. 1 it is explained, by way of example, how our method may encode HDR images/video. The content creator, e.g. a Hollywood movie studio, has made a master grade original HDR signal HDR_ORIG, which may be encoded e.g. with a codec having a 20 bit linear luma representation. This image is HDR because it is graded such that it will look optimal on displays having at least higher luminance (typically above 1000 nit peak white), and usually also deeper blacks, higher color rendering precision etc. For the purpose of readability the explanation is focused on the luma/luminance component of the image pixels, but typically a system will also do color mapping to arrive at optimally rendered colors. A HDR signal is not simply usable on a legacy LDR display. Firstly because it is inappropriately encoded. In our approach we typically encode images, so also the HDR images in a backwards compatible manner, with 10 bit or even 8 bit luma. Ignoring the actual pixels colors, such an image may then be compressed and handled by a classical image transmission format, e.g. by MPEG2, AVC, VP8, JPEG, etc. encoding. But, the actual pixel colors are important too, and this is where our encoding method adds a second phase, otherwise it would go wrong. We encode the HDR image in such a way that it can be directly rendered on a legacy display. In other words, it would have sufficient visual quality on such a display (the colors of the image objects reasonable approximating what they would look like in an original scene, or at least as best as an LDR display could render such, given however an important constraint of not losing the HDR image effect information in that signal). We therefore apply transformations which in principle are reversible (i.e. mapping from HDR_ORIG to LDR_CONT can be undone, to obtain HDR_PRED from LDR_ORIG by applying the inverse luma/color mapping), or at least, such that from our obtained LDR encoding LDR_CONT, we can perfectly (or at least with minimal error) retrieve as a mapped estimate HDR image HDR_PRED, the original master grade HDR_ORIG. This means that the algorithms doing the luma (and color) mapping should be such as not to destroy the HDR information. To emphasize this important point more precisely: that HDR information, although not perfectly renderable (e.g. one may cram together some darker parts of the image so that they are not distinguishable anymore on a low peak brightness LDR display under typical surround conditions), is still recoverable by applying the mapping algorithms (the lumas 10, 11, 12, . . . 15 could e.g. be mapped to HDR lumas 25, 30, 48, . . . 100, especially if not too many artefacts like banding are thereby visible in the estimated/reconstructed by mapping HDR image. So although we may say that LDR_CONT is an LDR grading/ image, it is a special one in that it still contains (at least nearly) all the HDR information of the master grade HDR_ORIG, because we used the appropriately constrained mapping to link HDR_ORIG and LDR_CONT.

Not applying such a corrective luma mapping to even an 8 bit encoding of HDR_ORIG, would result in unusable images for legacy devices, as they would look too distorted colorimetrically. E.g., one may have a dark basement scene with bright highlights. Since a high peak luminance HDR display can render the lower luma pixel codes with relatively high output luminance, we may allocate low pixel lumas to all these pixels (e.g. 0 . . . 10), and then have no pixels with intermediate lumas, and values (250-255) for the bright lights (if we were to encode an HDR grade in an 8 bit representation). Showing this signal on an LDR display however binarizes it. All the dark values are typically seen as the same black. So we need to apply a luma mapping F_TM1 which prebrightens the darker lumas (e.g. 0 . . . 5 becomes 10 . . . 20, with an additive and multiplicative mapping), so that the dark room is still visible on the LDR display when this HDR encoding is directly rendered as if it was an LDR image. So we encode the HDR image as if it was an LDR image, or in other words, we encode the HDR and LDR image with the same picture representation. But, this LDR_CONT image is not directly usable to render the correct master grade HDR_ORIG on a HDR display. Since we have e.g. brightened the dark parts of the room so that they will look distinguishable on an LDR display, they will look very bright on a HDR display, and lose all scary mood as intended by the content creator. The solution to get them correct again, is in the inverse luma mapping algorithm FL2H.

A mapping algorithm may in some scenarios be as simple a applying a single gamma function (e.g. HDR luma Y_HDR=a*Y_LDR^g), even for an entire scene or movie, or it may be more sophisticated taking also local color optimization into account since the visual system sees color appearances relatively. E.g., a coarse segmentation strategy may define some thresholds before sets of blocks in an image. In zig-zag scan before block (X,Y) one uses a first luma mapping function, then before block (X,Y) two LDR luma thresholds g_l and g_h are specified, indicating that for regions at positions from (X,Y) onwards having pixel lumas in between these boundaries, should be treated differently, e.g. with a second luma mapping strategy/algorithm. E.g. if an LDR luma Y_LDR equal to 128 was mapped to Y_HDR=2099 (in some agreed representation, e.g. 20 bit; for simplicity in the Figure we have made the range of reconstructed HDR lumas a float [0.1] range) by the first luma mapping function, it can now by the second mapping algorithm be mapped e.g. to Y_HDR=200. E.g. one may process the whites of a shirt so that they don't glow too much. Later on in that same picture after block (X+K, Y+L), there may be the same range of Y_LDR values in the LDR image representation LDR_CONT, but this may be a very bright lamp. It can be processed differently to yield very bright Y_HDR lumas by means of a third local mapping algorithm.

In any case, all the information of the mapping algorithms (functional parameters, image numbers such as e.g. presentation times, local shape definition information, etc.), are the key to obtain the original master grade HDR_ORIG again, or at least an HDR grade HDR_PRED which looks (very) close to it. This grade will look as intended, optimal on a reference HDR display, or any bright display having physical characteristics close to the reference HDR display, and not e.g. too bright at certain positions, or in general of incorrect color.

Now our system allows the content creator to specify which mapping algorithms are to be used to obtain the best look, in fact their master grade. They could e.g. specify different mapping algorithms for different HDR displays, as one can imagine one may use a different mapping for mapping a bright sunny exterior through a window on a 1000 nit display versus a 25.000 nit display. So this way already the rendering can be tailored by the content owner, and allows the creator to specify different looks for some reasons (e.g. one could envisage a cheaper look, which is kind of half-HDR). But furthermore, having all this visual quality in this/these mapping algorithms allows the creator the implement vastly increased content protection in addition to existing measures, and therefore get fair return value on his effort. The user may opt to view a low quality version by putting any pirated LDR version (e.g. a LDR_CONT extracted somewhere from a regular system) on his HDR display. In the following the set of mapping algorithms and further parameters will be called video processing metadata, which metadata defines how to convert between LDR and HDR video or vice versa. If the user wants optimal video experience, he will need to apply the video processing metadata to convert LDR to HDR, or, where HDR is available, to convert the HDR to LDR.

A HDR video distribution system as described in the introductory part is enhanced so that the video processing metadata is transferred to the rendering side. It is not proposed to include video processing metadata as private data with the video stream, e.g. in SEI messages in the case of AVC or HEVC coding, because the inventors have seen problems with the including video processing metadata in private data of the video elementary stream. For example, it is a problem that such private data is closely coupled to the video stream, because it may contain, in addition to HDR parameters for the video, information for processing graphics overlays when output to HDR display. Including graphics processing data in a video stream would require intense cooperation of different processing engines for video and graphics in a player. For example: the brightness level of subtitles may be reduced with a certain percentage to avoid annoyingly high brightness of subtitles, for example as described in WO2012/172460. A further problem of private data would be that the video processing metadata needs to be included on the disc from the start.

The present system resolves the above problems by putting the video processing metadata in a separate video processing elementary stream. Such a separate elementary stream enables both integrated distribution (e.g. HDR and LDR video on a single Blu-ray disc) and separate distribution (e.g. a download model), as elucidated below in detail. For instance, initially the installed base of HDR displays is relatively small. A disc can be released with LDR content. Later on the parameters are made available for HDR display.

Another reason to separately supply the metadata could be a business model where the customer can buy the HDR metadata separately.

The video processing elementary stream may contain a sequence of video processing segments with each segment associated with a certain sequence of video frames, as elucidated below. The video processing elementary stream may be synchronized with the video, graphics and audio elementary streams, e.g. through the MPEG 2 transport stream mechanism. The brightness/color adaptation video processing elementary stream contains instructions for the playback device to adapt the brightness level and/or color space of the video and/or graphics depending on the capabilities of the display device. An extended stream information file may include information for indicating which of the video and/or graphics elementary streams can be selected for processing by a playback device for generating a video output signal for a display device. The extended stream information indicates one or more brightness/color adaptation video processing metadata elementary streams that can be selected for processing by the playback device. The separate video processing elementary stream can now be used in various ways for transferring the video via broadcasting, a network or a storage medium such as an optical disc like Blu-ray, for example:

1. Multiplexed together with the main video, graphics and audio streams into a single MPEG2 transport stream (TS) and stored on the Blu-ray disc. This is the so-called in-mux case. This involves a storage medium containing at least one multiplexed stream and a playlist file, in which the multiplexed stream includes at least a video elementary stream, at least one brightness/color adaptation HDR metadata stream and zero or more graphics streams.

2. Multiplexed in a separate MPEG2 TS included on the disc, which is pre-loaded before playback starts. This is called the out-of-mux case. This involves a storage medium containing at least two multiplexed streams and a extended stream information, in which the first multiplexed stream includes at least a video elementary stream and zero or more graphics streams and a second multiplexed stream includes at least one brightness/color adaptation HDR metadata stream. The second multiplexed stream may further comprise one or more graphics streams that are adapted for HDR rendering.

3. Multiplexed in a separate MPEG2 TS, optionally with additional graphics (subtitle) and/or audio streams, which can be downloaded after the disc has been bought. This is also an out-of-mux case. This case may involve a storage medium containing at least one multiplexed stream, at least one extended stream information and at least one data file, in which the multiplexed stream includes at least a video elementary stream, and zero or more graphics streams and zero or more brightness/color adaptation HDR metadata streams. The data file enables the player to download a brightness/color adaptation video processing elementary stream from a server.

Figure 2:
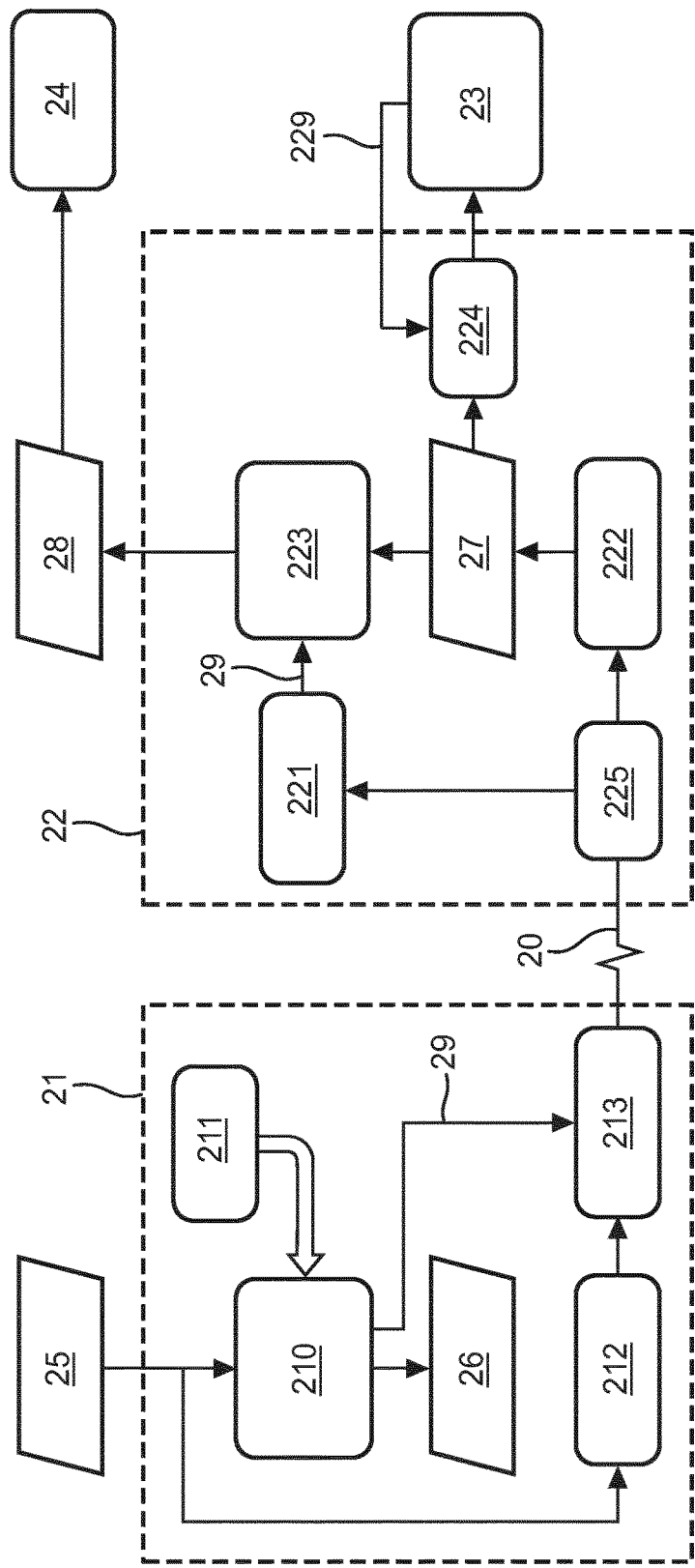
FIG. 2 shows a block diagram of a HDR video transfer system having primary HDR video.

FIG. 2 shows an example of a block diagram of a HDR video transfer system having primary HDR video. The video transfer system has a video processing device 21 having an input for receiving input video 25, for example HDR video. The input video is coupled from the input to a video processing unit 210 for processing the input video to provide video processing metadata 29 representing a conversion between HDR video and LDR video. The video processing unit may generate local output video 26, for example LDR video, which is, in the Figure, not further coupled but may be used for local display for monitoring the conversion process. Conversion involves pixel brightness and/or color mapping, but no spatial scaling etc. Examples of the processing metadata that define the conversion have been discussed above with FIG. 1, while detailed examples are provided later. The conversion unit may be coupled to an interactive unit 211 for controlling the conversion process.

The input video is also coupled from the input to a video encoding unit 212 for generating a primary video stream coupled to a formatting unit 213. The primary video stream now contains the encoded version of the input video having a first range of brightness or color for a first type of display, e.g. a HDR display, whereas the local output video has a second range of brightness of color as required for displaying on a second type of display, e.g. a standardized LDR display. The down conversion of the HDR video to the LDR video generates respective video processing metadata. The HDR metadata may comprise an indicator for indicating the type of conversion. Also, the video processing metadata may be for up converting LDR video to HDR video. Also, different levels of conversion may be embedded in the video processing metadata, e.g. for displays having medium, high or very high brightness levels, or for different color gamuts. Hence, the primary video may be either LDR video to be up-converted, or some type of HDR video that may be converted down to LDR video or to some different level of HDR video based on the video processing metadata comprising a respective correction scheme of adapting the brightness range or color range. For example, the primary video may contain medium level HDR video, whereas the video processing metadata provides instruction for both down-converting to LDR video and, alternatively, further up-converting to a higher level HDR display. Furthermore, multiple video processing elementary streams may be included in the formatted signal to enable the rendering side to select the appropriate conversion of the primary video.

The formatting unit 213 also receives the video processing metadata 29. The formatting unit 213 is arranged for generating a formatted video signal 20 by performing the following functions. As such, the formatting of signal according to a required transfer format such as BD or MPEG is well known. The formatting unit is arranged for additionally including the video processing elementary stream and the extended stream information. A primary video elementary stream is generated representing the input video, for example HDR video. The video processing elementary stream is generated that does not comprise audiovisual content, but comprises the video processing metadata. Also the extended stream information is generated comprising an entry indicative of the video processing elementary stream. In the example, the formatted video signal 20 comprises a primary video elementary stream representing the extended video and a video processing elementary stream not comprising audiovisual content but comprising video processing metadata representing a conversion between the extended video and the standard video. Detailed examples are provided later. Finally the formatted video signal is generated by including the primary video elementary stream, the video processing elementary stream and the extended stream information.

The video transfer system further has a video player 22, for example a set-top box, a tablet computer or a BD player. The video player has an input unit 225 for receiving the formatted video signal and extracting the extended stream information and the video processing metadata 29. The extended stream information and the video processing metadata are stored and processed in a HDR parameter unit 221, which is coupled to a processing unit 223. The player further has a video decoder 222 that receives the primary video from the input unit 225 and generates decoded primary video 27. For example, when the primary video is HDR video, the decoded primary HDR video is coupled to a HDR display interface unit 224, which may provide a HDR video signal to a HDR monitor 23.

Furthermore, the video player may provide a converted video signal, called target video 28, to a legacy LDR monitor 24. Thereto the processing unit initially processes the extended stream information to retrieve the extended stream information entry indicating a selectable video processing elementary stream. If the entry indicates the presence of at least one stream, a respective video processing elementary stream is selected. The selection may be based on the target display, i.e. the type of LDR display 24. Subsequently, the processing unit converts the primary video from the primary video elementary stream into target video 28 adapted to brightness and/or color rendering capabilities of the target display device by processing the primary video according to the video processing metadata. In the example, the primary HDR video is down converted to LDR video based on the video processing metadata.

Figure 3:
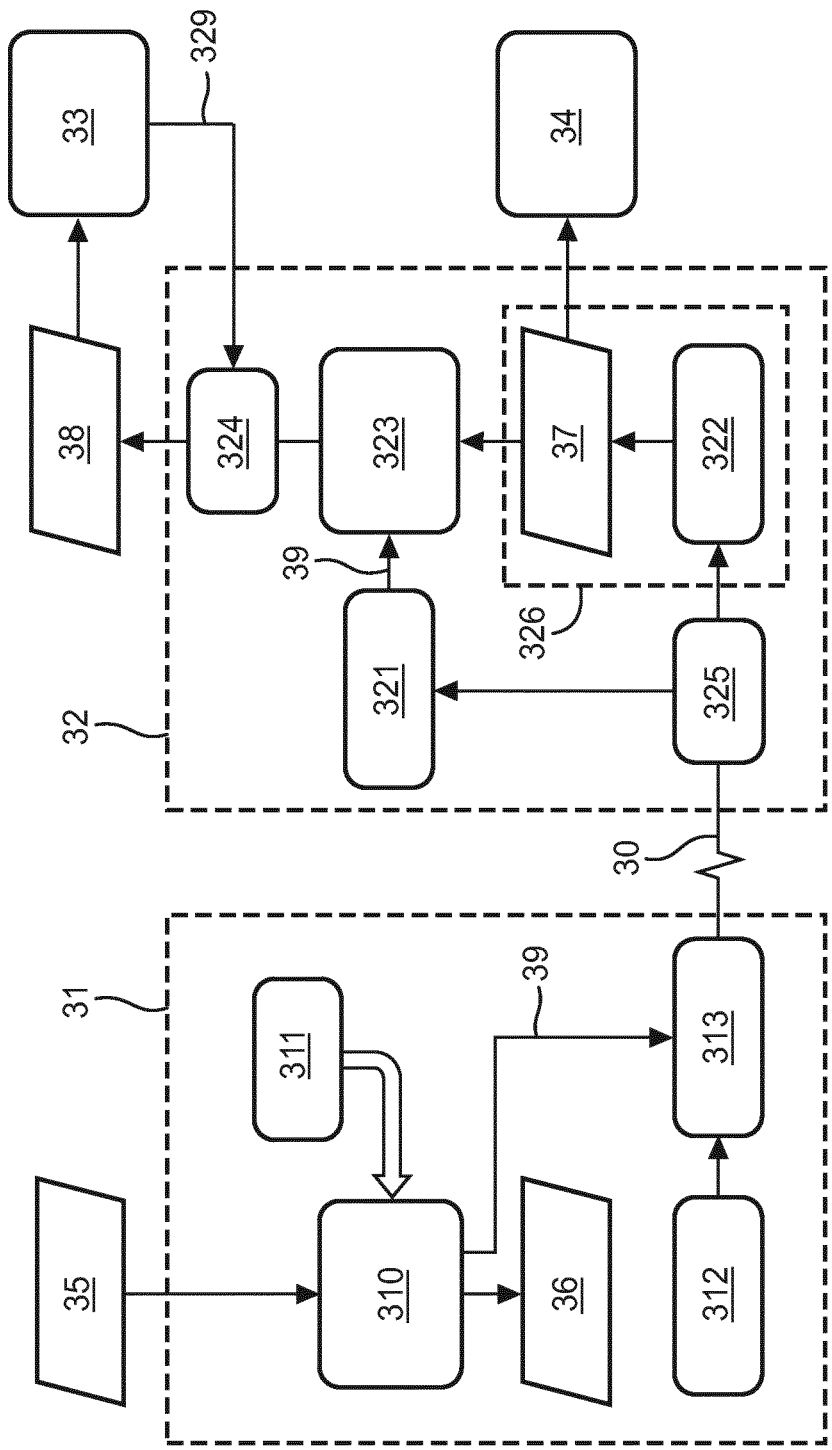
FIG. 3 shows a block diagram of a HDR video transfer system having primary LDR video.

FIG. 3 shows an example of a block diagram of a HDR video transfer system having primary LDR video. The video transfer system has a video processing device 31 having an input for receiving input video 35, for example HDR video. The input video is coupled from the input to a video processing unit 310 for processing the input video to provide video processing metadata 39 representing a conversion between HDR video and LDR video. The video processing unit generates local output video 36, for example LDR video, which is, in the Figure, coupled to a video encoding unit 312 and may be also used for local display for monitoring the conversion process as described with FIG. 2 above. The conversion unit 310 may be semi-automatic, and may be coupled to an interactive unit 311 for giving artistic guidance and further controlling the conversion process.

The video encoding unit 312 receives the local output video 36 and generates a primary video stream coupled to a formatting unit 313. The primary video stream now contains the encoded version of the converted input video having a first range of brightness or color for a second type of display, e.g. a LDR display, whereas the input video has a second range of brightness of color as required for displaying on a second type of display, e.g. a HDR display. The down conversion of the HDR video to the LDR video generates respective video processing metadata that now define the converting inverse to the applied conversion in conversion unit 310, e.g. for up converting the primary LDR video to HDR target video. Various other types of conversion are described above with FIG. 2, and the system may be arranged to be configured as shown FIG. 2 or FIG. 3 as required, e.g. by a software configuration setting. This enables receiving input LDR or HDR video, and transferring LDR or HDR primary video, while the conversion required at the rendering side may be to either down convert or up convert the primary video in dependence of the type of display. The formatting unit 313 also receives the video processing metadata 39 and is arranged for generating a formatted video signal 30 similar to the formatted signal 20 as described with FIG. 2, but now containing standard, LDR primary video and video processing metadata representing a conversion from the standard video to the extended video.

The video transfer system further has a video player 32, for example a set-top box, a tablet computer or a BD player. The video player has an input unit 325 for receiving the formatted video signal and extracting the extended stream information and the video processing metadata 39. The extended stream information and the video processing metadata are stored and processed in a HDR parameter unit 321, which is coupled to a processing unit 323. The player further has a video decoder 322 that receives the primary video from the input unit 325 and generates decoded primary video 37. For example, when the primary video is LDR video, the decoded primary LDR video may be coupled to a legacy LDR display 34.

It is noted that a legacy video player may have a similar input unit, which ignores the entry in the extended stream information and the video processing elementary stream, while the video decoder 322 generating the LDR video output constitutes a legacy video decoder system 326. Hence, downward compatibility is achieved.

In the video player 32 the decoded primary video 37 is coupled to the video processing unit 323, which generates target video 38 to be coupled to a HDR monitor 33 via interface unit 324. Hence the primary LDR is up converted to a target HDR video signal for HDR monitor 33. Thereto the processing unit initially processes the extended stream information to retrieve the extended stream information entry and to select a suitable video processing elementary stream. The brightness and/or color rendering capabilities 329 of the target display device 33 may be determined by communicating via the display interface 324. Subsequently, the processing unit converts the primary video from the primary video elementary stream into target video 38 adapted to brightness and/or color rendering capabilities of the target display device by processing the primary video according to the video processing metadata. In the example of FIG. 3, the primary LDR video is up converted to HDR video based on the video processing metadata.

Figure 4:
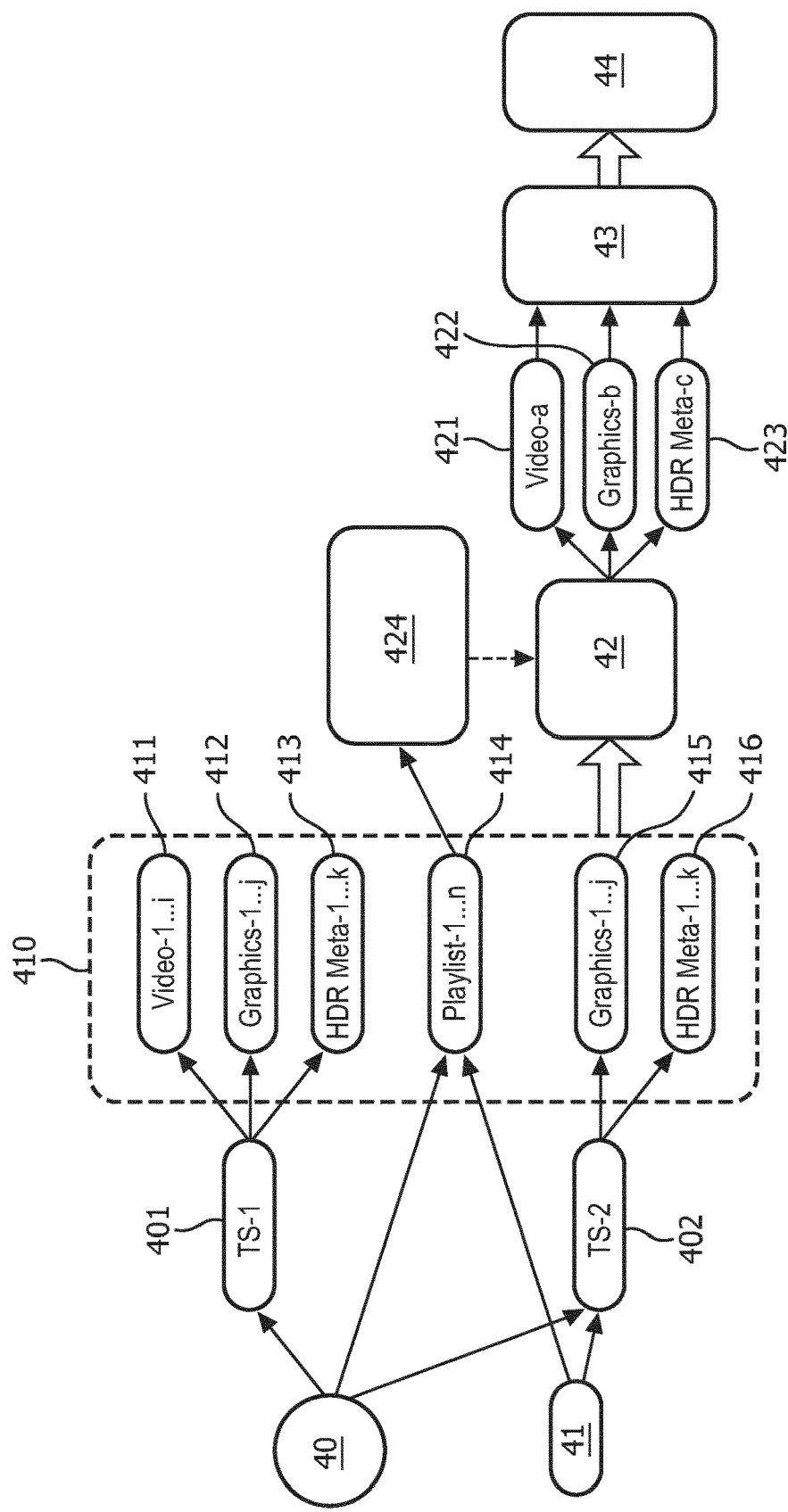
FIG. 4 shows a block diagram of a HDR video distribution system.

FIG. 4 shows a block diagram of a HDR video distribution system. A formatted video signal is embodied by an optical record carrier 40, e.g. a BD, and/or download data 41. The record carrier carries a first transport stream 401 marked TS-1 and the download data may contain a second transport stream 402 marked TS-2. The first transport stream contains at least one primary video elementary stream 411, at least one graphics elementary stream 412 and zero or more video processing streams 413. The second transport stream contains zero or more graphics elementary streams 415 and at least one video processing stream 416. The record carrier further carries an initial playlist, which is replaced upon downloading by a extended stream information included in the download data for constituting the actual playlist 414. It is noted that the initial playlist on the record carrier may be a extended stream information indicating that zero or more video processing elementary streams are present on the disc in TS-1. The combination of audiovisual data and video processing metadata may be called a virtual package, as indicated by dashed box 410.

A selection unit 42 processes the data of the virtual package, while providing a user interface 424 such as a menu for enabling a selection of the respective elementary streams to be rendered in combination. For example a user selects a specific video elementary stream 421, audio and or graphics 422, and a video processing stream 423 to be applied. The selection of the video processing stream may also be based on a preparatory user setting, or may be automatic based on the type of display and/or environmental conditions detected by the video player. The selected elementary streams are guided to a renderer 43, which renderer includes a processing unit for converting the primary video from the primary video elementary stream into target video by processing the primary video according to the video processing metadata from the selected video processing elementary stream.

Please note that, for sake of simplicity many aspects of the current BD system are not shown in the diagram of FIG. 4. For example, it does not show audio streams, secondary video streams, different graphics streams or streams for sounds and/or fonts. Moreover, the system does not show graphics generated in BDJ mode. Such known elements may be added where appropriate. Background information on the Blu-ray Disc format can be found in a White Paper published by the Blu-ray Disc Association: http://www.bluraydisc.com/assets/Downloadablefile/BD-ROM-AV-WhitePaper_110712.pdf The disc contains at least one playlist and at least one Transport stream (TS-1) with at least one video stream and optionally graphics streams and optionally HDR metadata streams. The disc may contain a second Transport stream (TS-2) with graphics streams and/or HDR Metadata streams. Alternatively the second transport stream and playlists (among others) may be downloaded from internet and stored in the player. In either way, all data from disc and download is collected in the so-called "Virtual Package". During playback, the user selects one of the playlists in the "Virtual Package". This playlist contains pointers to the Video, Graphics and HDR Metadata streams that are required to play the contents of the playlist. Based on this information, the selector 42 sends the corresponding streams to the renderer 43 which transforms the Video and Graphics data into an appropriate signal for the display. The Video and Graphics processing by the renderer is controlled by the information in the HDR metadata. More details on the selection of the correct streams and the data structures on the disc that are required for this selection are described further on in this document under "Download & Stream selection".

As an example, a possible definition of a video processing elementary stream is described now. Basic syntactic elements of video processing elementary stream are called "video processing segments". The video processing elementary stream may have a sequence of video processing segments, a respective segment being associated with a corresponding sequence of video frames. In the video player, the processing unit may be further arranged for converting a respective sequence of video frames of the primary video into target video by processing the frames according to the HDR metadata from the corresponding segment. The video processing segments correspond to a time period of the video, i.e. said sequence of video frames, which period is to be processed by a set of processing instructions as defined in the respective video processing segment.

The video processing segments constituting a video processing elementary stream may be carried in a sequence of PES packets. Packetized Elementary Stream (PES) is a specification in the MPEG-2 Part 1 (Systems) (ISO/IEC 13818-1) and ITU-T H.222.0 that defines carrying of elementary streams (usually the output of an audio or video encoder, but now a processing schedule according to the HDR metadata) in packets within MPEG program stream and MPEG transport stream. The elementary stream is packetized by encapsulating sequential data bytes from the elementary stream inside PES packet headers. A typical method of transmitting elementary stream data from a video or audio encoder is to first create PES packets from the elementary stream data and then to encapsulate these PES packets inside Transport Stream (TS) packets or Program Stream (PS) packets. The TS packets can then be multiplexed and transmitted using broadcasting techniques, such as those used in an ATSC and DVB. The PES packets of the video processing elementary stream are sequentially carried by transport packets in a HDMV MPEG-2 transport stream. Each PES packet in a HDR packetized elementary stream carries one video processing segment. All of the transport packets carrying a particular video processing elementary stream shall have the same PID. The syntax of the video processing elementary stream may be as shown in FIG. 5a-d.

FIG. 5a-d show an example of a video processing elementary stream. The video processing metadata in the video processing elementary stream may have a field indicating a number of video processing segments in the video processing elementary stream. The video processing metadata in the video processing elementary stream may have a video processing segment comprising at least one presentation time stamp and a segment descriptor. The video processing metadata in the video processing elementary stream may have an extended range info field comprising multiple different process descriptors, a respective process descriptor defining the conversion for a respective data type, the data types comprising video and at least one of graphics and subtitles.

FIG. 5a shows a video processing elementary stream having a field indicating a number of video processing segments. The field number_of_HDR_Segments 51 indicates the number of the video processing segment structures in the video processing elementary stream. The elementary stream may also have a further field indicating the conversion type like LDR to HDR, or HDR to LDR.

FIG. 5b shows an example of the syntax of the video processing segment. The Figure shows a video processing segment 52. The segment has a segment descriptor as further detailed in FIG. 5c and presentation time stamps HDR_start_PTS and HDR_end_PTS for synchronizing the segments to the primary video, and a HDR_info field for indicating the video processing metadata.

HDR_start_PTS:

This 33-bit field indicates a presentation start time of the HDR_segment( ), and shall point to a time on a system time base of the HDR stream, measured in units of a 90 kHz clock. The HDR_start_PTS value shall be on the video frame grid.

HDR_End_PTS:

This 33-bit field indicates a presentation end time of the HDR_segment( ), and shall point to a time on a system time base of the HDR stream, measured in units of a 90 kHz clock. The HDR_end_PTS value shall be on the video frame grid.

FIG. 5c shows an example of the syntax of the Segment Descriptor. The Figure shows a segment descriptor 53. The segment descriptor has the following fields.

Segment_Type:

This field indicates the type of data contained in the segment_data( ) structure. This will be a fixed number to be defined in the standard.

Segment_Length:

The segment_length shall specify the number of bytes contained in the segment immediately following segment_data( ) structure.

FIG. 5d shows an example of the syntax of the HDR info. The Figure shows an extended range info field 54, the HDR info element. The extended range info field has multiple different process descriptors. A respective process descriptor defines the conversion for a respective data type. Data types may for example be video, graphics and subtitles. The HDR element may have the following fields:

Video_process_descriptor
Menu_process_descriptor
Subtitle_process_descriptor

Figures 6, 7A, 7B, 7C:
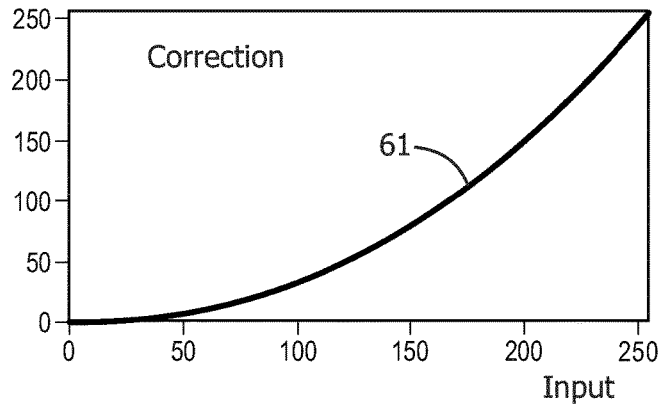

The fields are further elucidated with reference to FIG. 6.

Examples of data in the HDR_info element are as follows. In the context of this document Tone Mapping is defined as: non-linear mapping of luma value of the input pixel to the luma value of the output pixel to match the characteristics of the display, viewing conditions and user preference. In case of local Tone Mapping, the processing varies depending on the position of the pixel within an image. In case of global Tone Mapping, the same processing is applied to all pixels. With respect to Tone Mapping the situation in the present day BD system is as follows:

Video Tone Mapping (global and/or local) is performed in the studio using a studio monitor.

Graphics Tone Mapping (generally different from Video Tone Mapping) is performed in the studio using a studio monitor.

Global Tone Mapping is performed in the display on the combined Video & Graphics signal. This processing is partly controlled by the brightness and contrast values set by the end-user. Experiments and theoretical studies have shown that optimal picture quality is achieved when:

1. Video Tone Mapping is optimized for End-user's Display.
2. Graphics Tone Mapping is optimized for End-user's Display.
3. The system allows for Graphics Tone Mapping different from Video Tone Mapping
4. The System allows for different Graphics Tone Mapping for different Graphics components
5. The system allows for Video & Graphics Tone mapping depending on Video characteristics.

In order to achieve optimal picture quality in the BD system, the proposal is to augment BD specification by adding said video processing elementary stream, containing the HDR metadata (e.g. in the HDR_info structure) the to allow for transmission of Brightness/Color adaption metadata. Using these data, the BD player performs additional Video Tone Mapping depending on the characteristics of the End-user's Display. Moreover, the BD player may perform additional Graphics Tone Mapping depending on the characteristics of the End-user's Display, which is generally different from the Video Tone mapping. The additional processing steps defined in HDR_info may be either mandatory or optional (recommendations), as may be defined in a new version of the BD standard.

In practice the end-user's display characteristics may for example be known to the player by means of user settings or by means or an information channel from the display to the player. The player may implement the following processing:

The Video is adapted based on the characteristics of the End-user's Display, for example by adjusting the Electrical-Optical Transfer Function.

The transparency of Graphics is adapted to improve readability of, for example menus. For example see WO2013/046095 as discussed in the introduction.

The luma of the subtitle and menus is adapted to reduce disturbing effect on the video, reduce fatiguing/annoying effect of too bright subtitles, reduce halo effect and/or reduce glare.

The list above gives a few examples of Video processing and Graphics processing but is not intended to be exhaustive.

Examples on how to use the field Video_process_descriptor( ) are as follows. The Video_process_descriptor may be used to specify the HDR related processing of the video. In this example Video_process_descriptor defines the extra processing of the video in case the End-user's Display is a HDR display. The Electro-Optical Transfer Function (EOTF) of a display describes the relationship between input luma value (Y') and output luminance (Y). In this case the EOTF is transformed by applying a brightness correction function: $Y'_{new} = \mathrm{Corr}(Y'_{old})$.

FIG. 6 shows an example of a brightness correction function. The Figure shows a curve 61 of input brightness on the horizontal axis versus output brightness on the vertical axis. The curve illustrates the above transformation of the EOTF.

FIG. 7a-c show video processing metadata. The figure shows various examples of video processing metadata in syntax tables in FIGS. 7a, 7b and 7c.

FIG. 7a shows a Video_process_descriptor for a brightness correction. The structure 62 of the correction process as shown may be applied to define the correction function as shown in FIG. 6.

In another embodiment, the Video_process descriptor may hold a procedure to be executed by the player, e.g. defined in a scripting language like JAVA. By executing this procedure, the player determines how to process the Primary Video.

FIG. 7b shows a Menu_process_descriptor for a correction of graphics. The Menu_process_descriptor 63 is used to specify the HDR related processing of the menus and other graphics locally generated in the video player. In this example Menu_process_descriptor defines the extra processing of the Pop-up menus in case the End-user's Display is a HDR display. More specifically, in this case the transparency level is adjusted such that it is always higher than Min_transparency_level. The result is that the menu is not 'blinded' by very bright scenes in the under laying (HDR) video.

In another embodiment, the Menu_process descriptor may hold procedure to be executed by the player, e.g. defined in a scripting language like JAVA. By executing this procedure, the player determines how to process the menus.

FIG. 7c shows a Subtitle_process_descriptor for a correction of subtitles. The Subtitle_process_descriptor 64 is used to specify the HDR related processing of the subtitles. In this example Subtitle_process_descriptor defines the extra processing of the subtitles when the end-user's display is a HDR display. More specifically, in this case the subtitles brightness is reduced by $Y'_{new} = \mathrm{ROUND}(4 * Y'_{old} / \mathrm{Subtitle\_Luma\_factor})$. The result is that the subtitles are not too bright and consequently are not causing fatiguing, halo effect or glare.

In another embodiment, the Subtitle_process descriptor may hold procedure to be executed by the player, e.g. defined in a scripting language like JAVA. By executing this procedure, the player determines how to process the subtitles.

Figures 8A, 8B:
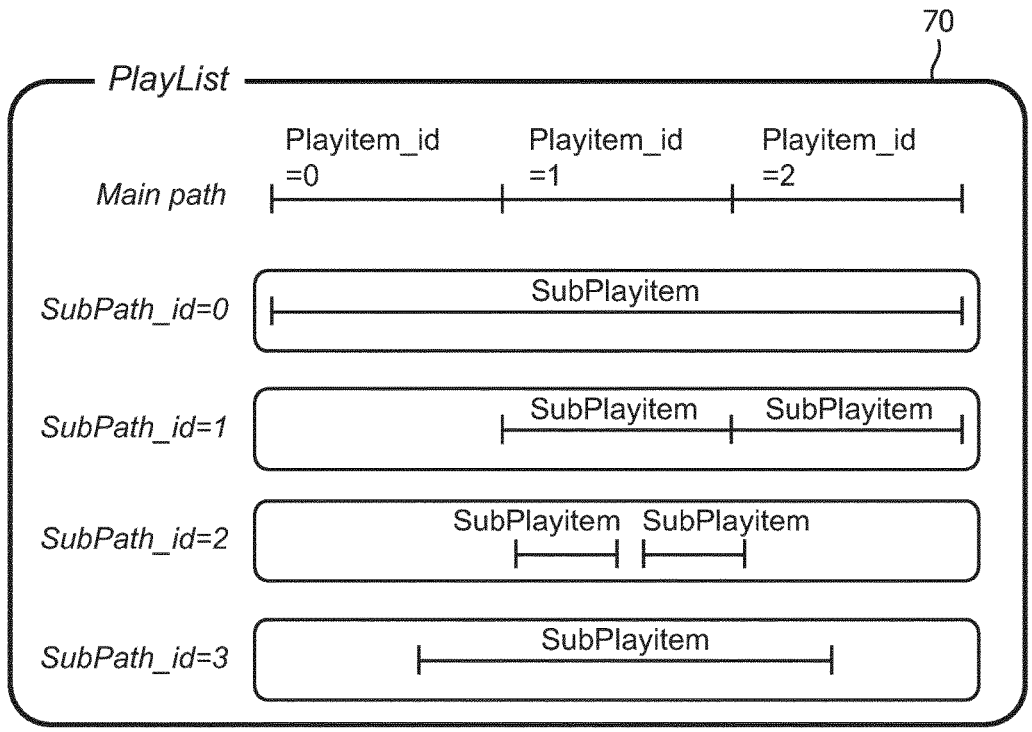

FIG. 8a-d show an example of a playlist. FIG. 8a shows the general structure of a playlist according to a standardized format. The Figure shows a playlist 70 according to the known BD system. The playlist describes a playback structure having a main path comprising a sequence of playitems, and various sub paths comprising respective sub-play-items. The playlist is adapted to an extended playlist, i.e. extended stream information, to facilitate selection of the video processing elementary stream and/or download of the video processing elementary stream.

In this example, the video player adapts the video and graphics processing based on processing information in the brightness/color adaptation HDR metadata. To acquire suitable video processing metadata, the player may need to download a new brightness/color adaptation video processing elementary stream and the player needs to know which streams are to be combined when rendering a specific part of the contents of the BD disc. How this can be realized is described in this section using, by way of example, the data structures on the present day BD disc and methods which are used in the present-day BD player in BD-J mode. BD has different modes of operation and different ways to use the player, i.e. resulting in a selection of elementary streams to combine when rendering.

Stream selection is explained using a typical user scenario. When a BD disc is inserted in a BD player, the player reads the "INDEX.bdmv" file from disc. The information in this file guides the player to the "FirstPlayback_bdjo_file". The "FirstPlayback_bdjo_file" is a JAVA program which will be executed by the player. Typically this execution of this JAVA program results is the rendering of a "Disc Menu". The user can now select a "Title" on the disc which will instruct the player to execute another JAVA program in the "Title_bdjo_file" corresponding to the "Title".

The JAVA program in the "Title_bdjo_file" may include instructions for the player to contact the server of the contents owner to check whether extra contents, related to this "Title" is available at the server. If this is the case this extra content is downloaded and stored in "Local storage" in the player. Next the contents in "local storage" and contents on the disc are combined in the "Virtual package". At this point all data that is required for rendering of the "Title" are available in the player. Typically the JAVA program in the "Title_bdjo_file" instructs the player to start a playlist as illustrated in FIG. 8. The figure shows the general structure of a playlist. A playlist holds one "Main path" and zero or more "SubPaths". Typically, the "Main path" holds the Video, Audio, Graphics and Subtitles whereas the "SubPaths" may hold additional Graphics, Subtitles. In this example, the brightness/color adaptation HDR metadata can be either in the "Main path" (In-mux) or in one of the "SubPaths" (Out-of-mux). The player renders the "Main path" and the optional "SubPaths" simultaneously.

FIG. 8b shows an example of the syntax of a playlist. The figure shows an example of a playlist 71 in a syntax table. The data structure of the playlist is according to the BD specification. The playlist holds a number of "PlayItems" 72 and a number of "Subpaths" 73 that shall be used by the player when rendering the playlist.

FIG. 8c shows an example of the syntax of a playitem in the playlist. The figure shows an example of a playitem in a syntax table. The data structure of the playitem is according to the BD specification. In the context of this description, the most relevant elements of the playItem are the "Clip_information_file_name" 74 and the "STN_Table" 75.

Clip_Information_File_Name:

The "Clip_information_file_name" is a reference to the "ClipInfo" file in the "Virtual Package". The data in this file will be used to resolve references to elementary stream locations (see below).

STN_Table:

The "STN_Table" defines a list of elementary streams in which the player can select during playback of the "PlayItem" and its related "SubPaths".

FIG. 8d shows a first part of a data structure of an elementary stream table. The elementary stream table called STN_Table is according to the BD specification. In this example, for creating the extended stream information, the STN_Table is extended with elements for the video processing elementary streams as indicated in FIG. 9.

FIG. 9 shows an example of the syntax of a extended stream information as an extension of an elementary stream table. The Figure shows the extended part of an elementary stream table STN_Table having an entry 91 indicative of the video processing elementary stream. In particular, the entry in the extended stream information is indicating the number of video processing elementary streams, the number being an integer larger than or equal to zero.

In the STN_Table respective elementary streams are defined by a "Stream_entry" 92 as further shown in FIG. 10a and "Stream_Attributes" 93 as further shown in FIG. 10b.

FIG. 10a shows a Stream_entry for an elementary stream table. Depending on the type of elementary stream, "Stream_entry" either holds a reference 94,96 to the stream identifier PID in the "main path" or a reference 95 to the PID of a "Subpath". Using the data in the "ClipInfo" file this reference is resolved such that the player knows where to find the elementary stream. Hence the player knows in which transport stream, "Main path" or "SubPath" the elementary stream is available and the player knows the stream identifier (PID) of the elementary stream in that transport stream.

FIG. 10b shows Stream_Attributes for an elementary stream table. The Stream_Attributes contain data related to the corresponding elementary stream, e.g. language code 97 for a subtitle stream. The data structure of the Stream_Attributes is according to the BD specification.

FIG. 11 shows an example of an element of the syntax of a extended stream information. The Figure shows an extended part of the syntax of Stream_Attributes in an elementary stream table STN_Table of the extended stream information. The extended Stream_Attributes define, for a video processing elementary stream, a data field 98 specifying the optimum display type of the corresponding primary video, e.g. a specific type of HDR display, or an LDR display. In this embodiment, by way of example, the "Stream_attributes" is augmented with one or more data elements for the respective video processing elementary stream.

FIG. 12 shows a definition of HDR display types. The tables shows a reference list of display type identifiers 99. The Optimum_Display_type is a number identifying a display with pre-defined HDR/Color related characteristics. For each display type a respective maximum brightness, and a color gamut, are defined. In this example of video processing metadata, the Optimum_Display_type indicates the type of display for which the video processing elementary stream has been optimized.

It is noted that the video processing elementary streams may be included in MPEG-2 transport streams, providing a synchronization mechanism through presentation time stamps (PTS) that are linked to the frame-based HDR parameter sets. A BD may contain said parameters, because the video processing elementary stream may be included in a TS with the main video and audio. Also, said HDR parameters can be added later by downloading a MPEG-2 TS as a sub-stream to the main TS, e.g. by applying the BD sub-path mechanism. The sub-stream may be downloaded using a progressive download mechanism, i.e. viewing may start while still downloading. The sub-stream may also contain an alternative presentation graphics stream (e.g. for subtitles) or adjustment parameters for that graphics to better match the HDR video output.

In the above description examples have been discussed using HDR video as an example of extended video having an extended range of brightness and/or color, and LDR video as an example of standard video having a standard range for brightness and/or color. In such examples, video processing metadata may be called HDR processing metadata, or a video processing elementary stream may be called a HDR processing elementary stream. It is to be noted that the distribution system may be applied for transferring, via a formatted video signal, any type of video having a first range of brightness and/or color in combination with a second version of the same video having a second range of brightness and/or color.

It should be clear what we mean technically with mapping lumas of a first to a second color representation. A luma is a technical code (e.g. $Y=[0,255]$) which has an association via a tone definition curve to a final luminance, whether e.g. as camera-captured or a display rendering referred. Various alternative technical realizations can exist, e.g. in a linear representation this third color coordinate could be the luminance itself, but a sufficiently technically experienced reader should perfectly understand what it is (for simplicity we pretend the luma ranges are floats (except for LDR_CONT which we assume classical 8 bit with gamma 2.2 etc), but of course one may also e.g. map from some 10 bit to some 15 bit luma definition.

The algorithmic components disclosed in this text may (entirely or in part) be realized in practice as hardware (e.g. parts of an application specific IC) or as software running on a special digital signal processor, or a generic processor, etc. They may be semi-automatic in a sense that at least some user input may be/have been (e.g. in factory, or consumer input, or other human input) present.

It should be understandable to the skilled person from our presentation which components may be optional improvements and can be realized in combination with other components, and how (optional) steps of methods correspond to respective means of apparatuses, and vice versa. The fact that some components are disclosed in a certain relationship (e.g. in a single figure in a certain configuration) doesn't mean that other configurations are not possible as embodiments under the same inventive thinking as disclosed for patenting herein. Also, the fact that for pragmatic reasons only a limited spectrum of examples has been described, doesn't mean that other variants cannot fall under the scope of the claims. In fact, the components can be embodied in different variants along any use chain, e.g. all variants of a creation side like an encoder may be similar as or correspond to corresponding apparatuses at a consumption side of a decomposed system, e.g. a decoder and vice versa. Several components of the embodiments may be encoded as specific signal data in a signal for transmission, or further use such as coordination, in any transmission technology between encoder and decoder, etc. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" or "system" is also intended to be used in the broadest sense, so it may comprise inter alia a single physical, purchasable apparatus, a part of an apparatus, a collection of (parts of) cooperating apparatuses, etc.

Various processing and formatting functions may also be implemented in software, which may be provided on a computer readable medium. A computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, to execute any of the characteristic functions. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Such data may be (partially) supplied in any way.

The present embodiments may also be embodied as signals on data carriers, which may be removable memories like optical disks, flash memories, removable hard disks, portable devices writeable via wireless means, etc.

Some of the steps required for the operation of any presented method may be already present in the functionality of the processor or any apparatus embodiments instead of described in the computer program product or any unit, apparatus or method described herein, such as data input and output steps, well-known typically incorporated processing steps such as standard display driving, etc. We also desire protection for resultant products and similar resultants, like e.g. the specific novel signals involved at any step of the methods or in any subpart of the apparatuses, as well as any new uses of such signals, or any related methods.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim, nor is any particular symbol in the drawings. The word "comprising" does not exclude the presence of elements or aspects not listed in a claim. The word "a" or "an" preceding an element does not exclude the presence of a plurality of such elements.

The invention claimed is:

1. A method of providing a formatted video signal for transfer according to a standardized transfer format, the standardized transfer format defining stream information having entries indicative of selectable elementary streams and elementary streams having a common structure according to the standardized transfer format and representing audiovisual content to be rendered in a selected combination of the elementary streams, a respective elementary stream representing one of video content, audio content, graphics content;

the formatted video signal representing extended video having an extended range of brightness and/or color with respect to standard video having a standard range of brightness and/or color, the standard range being as defined in the standardized transfer format;

the method comprising:

processing input video to provide video processing metadata representing a conversion between the standard video and the extended video and generating a primary video elementary stream representing the standard video, or processing input video to provide video processing metadata representing a conversion between the extended video and the standard video and generating a primary video elementary stream representing the extended video;

generating a video processing elementary stream having the common structure but not comprising audiovisual content, the video processing elementary stream comprising the video processing metadata for converting in rendering the selected combination, wherein the video processing metadata in the video processing elementary stream comprises an extended range info field comprising multiple different process descriptors, a respective process descriptor defining the conversion for a respective data type, the data types comprising video and at least one of graphics and subtitles, generating extended stream information comprising at least an entry indicative of the primary video elementary stream and an entry indicative of the video processing elementary stream, and generating the formatted video signal comprising the primary video elementary stream, the video processing elementary stream and the extended stream information.

2. Method as claimed in claim 1, wherein the method comprises applying, for said conversion, a transformation that is reversible by applying inverse mapping to the video in the primary video elementary stream, and the video processing metadata in the video processing elementary stream comprises information on the mapping.

3. Method as claimed in claim 1, wherein the formatted video signal has a first transport stream and a second transport stream, and the method comprises including, in the first transport stream, the primary video elementary stream, including, in the second transport stream, the video processing elementary stream.

4. Method as claimed in claim 3, wherein the method comprises transferring the first transport stream via a medium, and transferring the second transport stream and the extended stream information via a network.

5. A video processing device for providing a formatted video signal for transfer according to a standardized transfer format, the standardized transfer format defining stream information having entries indicative of selectable elementary streams and elementary streams having a common structure according to the standardized transfer format and representing audiovisual content to be rendered in a selected combination of the elementary streams, a respective elementary stream representing one of video content, audio content, graphics content;

the formatted video signal representing extended video having an extended range for brightness and/or color with respect to standard video content having a standard range, the standard range being as defined in the standardized transfer format;

the processing device comprising:

a video processing unit for processing input video, and a formatting unit for generating the formatted video signal;

the video processing unit and the formatting unit being arranged for processing input video to provide video processing metadata representing a conversion between the standard video and the extended video and generating a primary video elementary stream representing the standard video, or processing input video to provide video processing metadata representing a conversion between the extended video and the standard video and generating a primary video elementary stream representing the extended video;

and the formatting unit being further arranged for generating a video processing elementary stream having the common structure but not comprising audiovisual content, the video processing elementary stream comprising the video processing metadata for converting in rendering the selected combination, wherein the video processing metadata in the video processing elementary stream comprises an extended range info field comprising multiple different process descriptors, a respective process descriptor defining the conversion for a respective data type, the data types comprising video and at least one of graphics and subtitles, generating extended stream information comprising at least an entry indicative of the primary video elementary stream and an entry indicative of the video processing elementary stream, and generating the formatted video signal comprising the primary video elementary stream, the video processing elementary stream and the extended stream information.

6. A video player for processing a formatted video signal according to a standardized transfer format, the standardized transfer format defining stream information having entries indicative of selectable elementary streams and elementary streams having a common structure according to the standardized transfer format and representing audiovisual content to be rendered in a selected combination of the elementary streams, a respective elementary stream representing one of video content, audio content, graphics content;

the formatted video signal representing extended video having an extended range for brightness and/or color with respect to standard video content having a standard range, the standard range being as defined in the standardized transfer format;

the formatted video signal comprising a video processing elementary stream having the common structure but not comprising audiovisual content, the video processing elementary stream comprising video processing metadata for converting in rendering the selected combination, a primary video elementary stream representing the standard video and the video processing metadata representing a conversion between the standard video and the extended video, or a primary video elementary stream representing the extended video and the video processing metadata representing a conversion between the extended video and the standard video;

and the formatted video signal further comprising extended stream information comprising at least an entry indicative of the primary video elementary stream and an entry indicative of the video processing elementary stream; and wherein the video processing metadata in the video processing elementary stream comprises an extended range info field comprising multiple different process descriptors, a respective process descriptor defining the conversion for a respective data type, the data types comprising video and at least one of graphics and subtitles;

the player comprising an input unit for receiving the formatted video signal and extracting the extended stream information and the video processing metadata, and a processing unit for processing the extended stream information, and, in dependence on the extended stream information entry indicating a video processing elementary stream, converting primary video from the primary video elementary stream into target video adapted to brightness and/or color rendering capabilities of a target display device by processing the primary video according to the video processing metadata, while using the respective process descriptors for the conversion of respective data types, the data types comprising video and at least one of graphics and subtitles.

7. The video player as claimed in claim 6, wherein
the formatted video signal comprises a transport stream including the primary video elementary stream and the video processing elementary stream, and
the input unit is arranged for receiving the transport stream and retrieving, from the transport stream, the primary video elementary stream and the video processing elementary stream; or
the formatted video signal comprises a first transport stream including the primary video elementary stream and a second transport stream including the video processing elementary stream, and
the input unit is arranged for receiving the first and second transport stream and retrieving,
from the first transport stream, the primary video elementary stream and
from the second transport stream, the video processing elementary stream.

8. The video player as claimed in claim 7, wherein
the input unit comprises an optical disc unit for reading an optical record carrier and retrieving the transport stream; or
the first transport stream; or
the first transport stream and the second transport stream.

9. The video player as claimed in claim 6, wherein
the input unit comprises a network interface for downloading the video processing elementary stream and the extended stream information from a server to local storage, and
the processing unit is arranged for replacing stream information received earlier by the extended stream information.

10. The video player as claimed in claim 6, wherein
said conversion is a transformation that is reversible by applying inverse mapping to the video in the primary video elementary stream and the video processing metadata in the video processing elementary stream comprises information on the mapping, and
the processing unit is arranged for said converting by applying the mapping according to the video processing metadata.

11. A formatted video signal for transfer according to a standardized transfer format, the standardized transfer format defining stream information having entries indicative of selectable elementary streams and elementary streams having a common structure according to the standardized transfer format and representing audiovisual content to be rendered in a selected combination of the elementary streams, a respective elementary stream representing one of video content, audio content, graphics content; the formatted video signal representing extended video having an extended range for brightness and/or color with respect to standard video content having a standard range, the standard range being as defined in the standardized transfer format; the formatted video signal comprising: a video processing elementary stream having the common structure but not comprising audiovisual content, the video processing elementary stream comprising video processing metadata for converting in rendering the selected combination, wherein the video processing metadata in the video processing elementary stream comprises an extended range info field comprising multiple different process descriptors, a respective process descriptor defining the conversion for a respective data type, the data types comprising video and at least one of graphics and subtitles a primary video elementary stream representing the standard video and the video processing metadata representing a conversion between the standard video and the extended video, or a primary video elementary stream representing the extended video and the video processing metadata representing a conversion between the extended video and the standard video; and the formatted video signal further comprising: extended stream information comprising at least an entry indicative of the primary video elementary stream and an entry indicative of the video processing elementary stream.

12. The formatted video signal as claimed in claim 11, wherein
the formatted video signal comprises a transport stream including the primary video elementary stream and the video processing elementary stream, or
said conversion is a transformation that is reversible by applying inverse mapping to the video in the primary video elementary stream and the video processing metadata in the video processing elementary stream comprises information on the mapping.

13. The formatted video signal as claimed in claim 12, wherein the formatted video signal is a broadcast signal, and the transport stream comprises the extended stream information in the form of program specific information.

14. The formatted video signal as claimed in claim 11, wherein the formatted video signal comprises
a first transport stream including the primary video elementary stream, and
a second transport stream including the video processing elementary stream, or—a file having network data specifying for a player where to download the video processing elementary stream.

15. A tangible computer-readable storage medium that is not a transitory propagating signal or wave, the storage medium storing stream information of a formatted video signal for transfer according to a standardized transfer format, the stream information having entries indicative of selectable elementary streams and elementary streams having a common structure according to a standardized transfer format and representing audiovisual content to be rendered in a selected combination of the elementary streams, a respective elementary stream representing one of video content, audio content, graphics content, the formatted video signal representing extended video having an extended range for brightness and/or color with respect to standard video content having a standard range, the standard range being as defined in the standardized transfer format; the formatted video signal comprising: a video processing elementary stream having the common structure but not comprising audiovisual content, the video processing elementary stream comprising video processing metadata for converting in rendering the selected combination, a primary video elementary stream representing the standard video and the video processing metadata representing a conversion between the standard video and the extended video, or a primary video elementary stream representing the extended video and the video processing metadata representing a conversion between the extended video and the standard video; and the formatted video signal further comprising: extended stream information comprising at least an entry indicative of the primary video elementary stream and an entry indicative of the video processing elementary stream wherein the video processing metadata in the video processing elementary stream comprises an extended range info field comprising multiple different process descriptors, a respective process descriptor defining the conversion for a respective data type, the data types comprising video and at least one of graphics and subtitles, wherein the formatted video signal comprises a first transport stream including the primary video elementary stream, and a second transport stream including the video processing elementary stream or a file having network data specifying for a player where to download the video processing elementary stream, the storage medium comprising a track of optical readable marks, wherein the marks represent the extended stream information and the first transport stream including the primary video elementary stream and the video processing elementary stream.

16. The tangible computer-readable storage medium as claimed in claim 15, wherein the video processing elementary stream comprises: a sequence of video processing segments, a respective segment being associated with a corresponding sequence of video frames, and/or instructions to adapt brightness level and/or color space of the video in dependence of brightness or color rendering capabilities of a display device, and/or instructions to adapt brightness level and/or color space of graphics in dependence of brightness or color rendering capabilities of a display device.

17. A tangible computer-readable storage medium that is not a transitory propagating signal or wave, the storage medium storing stream information of a formatted video signal for transfer according to a standardized transfer format, the stream information having entries indicative of selectable elementary streams and elementary streams having a common structure according to a standardized transfer format and representing audiovisual content to be rendered in a selected combination of the elementary streams, a respective elementary stream representing one of video content, audio content, graphics content, the formatted video signal representing extended video having an extended range for brightness and/or color with respect to standard video content having a standard range, the standard range being as defined in the standardized transfer format; the formatted video signal having a first transport stream and a second transport stream, the formatted video signal comprising: a video processing elementary stream having the common structure but not comprising audiovisual content, the video processing elementary stream comprising video processing metadata for converting in rendering the selected combination, a primary video elementary stream representing the standard video and the video processing metadata representing a conversion between the standard video and the extended video, or a primary video elementary stream representing the extended video and the video processing metadata representing a conversion between the extended video and the standard video; and the formatted video signal further comprising: extended stream information comprising at least an entry indicative of the primary video elementary stream and an entry indicative of the video processing elementary stream wherein the video processing metadata in the video processing elementary stream comprises an extended range info field comprising multiple different process descriptors, a respective process descriptor defining the conversion for a respective data type, the data types comprising video and at least one of graphics and subtitles, wherein the formatted video signal comprises a first transport stream including the primary video elementary stream, and a second transport stream including the video processing elementary stream or a file having network data specifying for a player where to download the video processing elementary stream, the storage medium comprising a track of optical readable marks, wherein the marks represent the extended stream information and the first transport stream including the primary video elementary stream and the second transport stream including the video processing elementary stream.

18. The tangible computer-readable storage medium as claimed in claim 17, wherein the video processing elementary stream comprises: a sequence of video processing segments, a respective segment being associated with a corresponding sequence of video frames, and/or instructions to adapt brightness level and/or color space of the video in dependence of brightness or color rendering capabilities of a display device, and/or instructions to adapt brightness level and/or color space of graphics in dependence of brightness or color rendering capabilities of a display device.

19. A tangible computer-readable storage medium that is not a transitory propagating signal or wave, the storage medium storing stream information of a formatted video signal for transfer according to a standardized transfer format, the stream information having entries indicative of selectable elementary streams and elementary streams having a common structure according to a standardized transfer format and representing audiovisual content to be rendered in a selected combination of the elementary streams, a respective elementary stream representing one of video content, audio content, graphics content, the formatted video signal representing extended video having an extended range for brightness and/or color with respect to standard video content having a standard range, the standard range being as defined in the standardized transfer format; the formatted video signal having a first transport stream and a second transport stream, the formatted video signal comprising: a video processing elementary stream having the common structure but not comprising audiovisual content, the video processing elementary stream comprising video processing metadata for converting in rendering the selected combination, a primary video elementary stream representing the standard video and the video processing metadata representing a conversion between the standard video and the extended video, or a primary video elementary stream representing the extended video and the video processing metadata representing a conversion between the extended video and the standard video; and the formatted video signal further comprising: extended stream information comprising at least an entry indicative of the primary video elementary stream and an entry indicative of the video processing elementary stream wherein the video processing metadata in the video processing elementary stream comprises an extended range info field comprising multiple different process descriptors, a respective process descriptor defining the conversion for a respective data type, the data types comprising video and at least one of graphics and subtitles, wherein the formatted video signal comprises a first transport stream including the primary video elementary stream, and a second transport stream including the video processing elementary stream or a file having network data specifying for a player where to download the video processing elementary stream, the storage medium comprising a track of optical readable marks, wherein the marks represent the extended stream information, the first transport stream but not the second transport stream.

20. The tangible computer-readable storage medium as claimed in claim 19, wherein the video processing elementary stream comprises: a sequence of video processing segments, a respective segment being associated with a corresponding sequence of video frames, and/or instructions to adapt brightness level and/or color space of the video in dependence of brightness or color rendering capabilities of a display device, and/or instructions to adapt brightness level and/or color space of graphics in dependence of brightness or color rendering capabilities of a display device.

\* \* \* \* \*